United States Patent
Konrad et al.

(10) Patent No.: US 12,346,495 B2
(45) Date of Patent: Jul. 1, 2025

(54) TRACKING SYSTEM USING A DIFFERENTIAL CAMERA WITH A CO-ALIGNED LIGHT SOURCE ASSEMBLY

(71) Applicant: Sesame AI, Inc., San Francisco, CA (US)

(72) Inventors: Robert Konrad Konrad, San Francisco, CA (US); Kevin Conlon Boyle, San Francisco, CA (US); Gordon Wetzstein, Palo Alto, CA (US); Nitish Padmanaban, Menlo Park, CA (US); John Gabriel Buckmaster, San Jose, CA (US)

(73) Assignee: Sesame AI, Inc., San Francisco, CA (US)

( * ) Notice: Subject to any disclaimer, the term of this patent is extended or adjusted under 35 U.S.C. 154(b) by 61 days.

(21) Appl. No.: 18/368,856

(22) Filed: Sep. 15, 2023

(65) Prior Publication Data

US 2024/0094811 A1    Mar. 21, 2024

Related U.S. Application Data

(60) Provisional application No. 63/439,778, filed on Jan. 18, 2023, provisional application No. 63/407,456, filed on Sep. 16, 2022.

(51) Int. Cl.
*G06F 3/01* (2006.01)
*G06T 7/20* (2017.01)
(Continued)

(52) U.S. Cl.
CPC ............... *G06F 3/013* (2013.01); *G06T 7/20* (2013.01); *G06V 10/141* (2022.01); *G06V 10/60* (2022.01);
(Continued)

(58) Field of Classification Search
None
See application file for complete search history.

(56) References Cited

U.S. PATENT DOCUMENTS

2016/0360970 A1   12/2016  Tzvieli et al.
2018/0075659 A1    3/2018  Browy et al.
(Continued)

FOREIGN PATENT DOCUMENTS

WO    WO-2022173671 A1 *  8/2022  ......... G02B 27/0093

OTHER PUBLICATIONS

PCT International Search Report and Written Opinion, PCT Application No. PCT/US2023/32887, Jan. 9, 2024, 14 pages.

*Primary Examiner* — James M Anderson, II
(74) *Attorney, Agent, or Firm* — Fenwick & West LLP

(57) ABSTRACT

A differential camera system for object tracking. The system includes a co-aligned light source camera assembly (LSCA) and a controller. The co-aligned LSCA includes a light source and a differential camera sensor. The light source is configured to emit light along an optical path that is directed towards an eye box including an eye of a user. The differential camera sensor is configured to detect a change in brightness of the eye caused in part by the emitted light, asynchronously output data samples corresponding to the detected change in brightness, wherein the optical path is substantially co-aligned with an optical path of the differential camera sensor. The controller is configured to identify a pupil of the eye based on data samples output from the differential camera sensor resulting from the emitted light, and determine a gaze location of the user based in part on the identified pupil.

18 Claims, 16 Drawing Sheets

(51) Int. Cl.
  *G06V 10/141* (2022.01)
  *G06V 10/60* (2022.01)
  *G06V 40/18* (2022.01)
  *H04N 23/611* (2023.01)
  *H04N 23/71* (2023.01)
  *H04N 23/74* (2023.01)
  *H04N 23/90* (2023.01)
  *H04N 25/47* (2023.01)

(52) U.S. Cl.
  CPC ......... *G06V 40/193* (2022.01); *H04N 23/611* (2023.01); *H04N 23/71* (2023.01); *H04N 23/74* (2023.01); *H04N 23/90* (2023.01); *H04N 25/47* (2023.01)

(56) References Cited

U.S. PATENT DOCUMENTS

2021/0369109 A1* 12/2021 Straub ..................... A61B 3/12
2022/0197376 A1* 6/2022 Boyle ................. G06V 40/193

* cited by examiner

300

```
┌─────────────────────────────────────────────────────────────┐
│ Instruct, by a controller, an eye tracking system to obtain │
│                 one or more samples of an eye of a user     │
│                              310                            │
└─────────────────────────────────────────────────────────────┘
                              │
                              ▼
┌─────────────────────────────────────────────────────────────┐
│ Calculate metrics of the movement of the eye based on the   │
│            data from at least one of the obtained samples   │
│                              320                            │
└─────────────────────────────────────────────────────────────┘
                              │
                              ▼
┌─────────────────────────────────────────────────────────────┐
│ Apply a model to the calculated metrics of the movement of  │
│        the eye to predict a time to obtain a next sample    │
│                              330                            │
└─────────────────────────────────────────────────────────────┘
                              │
                              ▼
┌─────────────────────────────────────────────────────────────┐
│ Instruct, by the controller, the eye tracking system to     │
│             obtain the next sample at the predicted time    │
│                              340                            │
└─────────────────────────────────────────────────────────────┘
```

FIG. 3

TRACKING SYSTEM USING A DIFFERENTIAL CAMERA WITH A CO-ALIGNED LIGHT SOURCE ASSEMBLY

CROSS-REFERENCE TO RELATED APPLICATIONS

This application claims the benefit of U.S. Provisional Application No. 63/407,456, filed on Sep. 16, 2022, and U.S. Provisional Application No. 63/439,778, filed on Jan. 18, 2023, each of which is hereby incorporated by reference in its entirety.

FIELD OF THE INVENTION

This disclosure relates generally to tracking systems, and more specifically to a tracking system that uses a differential camera with a co-aligned light source assembly.

BACKGROUND

Eye tracking systems capture images of the eyes to determine the 3D gaze of the user, or a 2D projection of that gaze onto a surface or plane, such as a screen or typical viewing distance. This may be done, e.g., either through a computer vision segmentation of the image of the eye into various parts (e.g., pupil, sclera, eye lids, etc.), the features of which are then exported as parameters that can be used to calculate the user's gaze based on calibration data or generate an eye model for the same purpose, or the eye images are fed directly into a neural network or other machine learning approach that infers the segmentation and/or user's gaze directly from the images based on a database of labeled eye images. These methods can demand substantial computational resources.

SUMMARY

Embodiments of a tracking system using a differential camera are described. The tracking system includes a co-aligned light source camera assembly (LSCA) and a controller. The co-aligned LSCA includes a light source and a differential camera sensor. The light source is configured to emit light that is directed along an optical path towards an eye box including an eye of a user. The differential camera sensor is configured to detect a change in brightness of the eye caused in part by the emitted light, and asynchronously output data samples corresponding to the detected change in brightness. The controller is configured to identify a pupil of the eye based on data samples output from the differential camera sensor resulting from the emitted light, and determine a gaze location of the user based in part on the identified pupil.

In some embodiments, a co-aligned light source camera assembly (LSCA) includes a light source and a differential camera sensor. The light source is configured to emit light along an optical path towards an eye box including an eye of a user. The differential camera sensor is configured to detect a change in brightness of the eye caused in part by the emitted light, and asynchronously output data samples corresponding to the detected changes in brightness. The optical path is substantially co-aligned with an optical path of the differential camera sensor. A controller is configured to identify a pupil of the eye based on data samples output from the image sensor resulting from the emitted light, and determine a gaze location of the user based in part on the identified pupil.

Co-alignment of light from the light source and the differential camera sensor can occur in different ways. In some embodiments, co-alignment is accomplished via placement of the light source relative to the differential camera sensor. For example, a light source placed adjacent to a differential camera sensor while having slightly offset optical paths in the near field, are substantially co-aligned at distances useful for object tracking. In some embodiments, optical elements (e.g., beam splitters, pinhole reflectors, etc.) may be used to co-align light emitted from the light source with an optical path of the differential camera sensor.

BRIEF DESCRIPTION OF THE DRAWINGS

FIG. 3 is a flowchart illustrating a process for smart sampling, in accordance with one or more embodiments.

Figure 1:
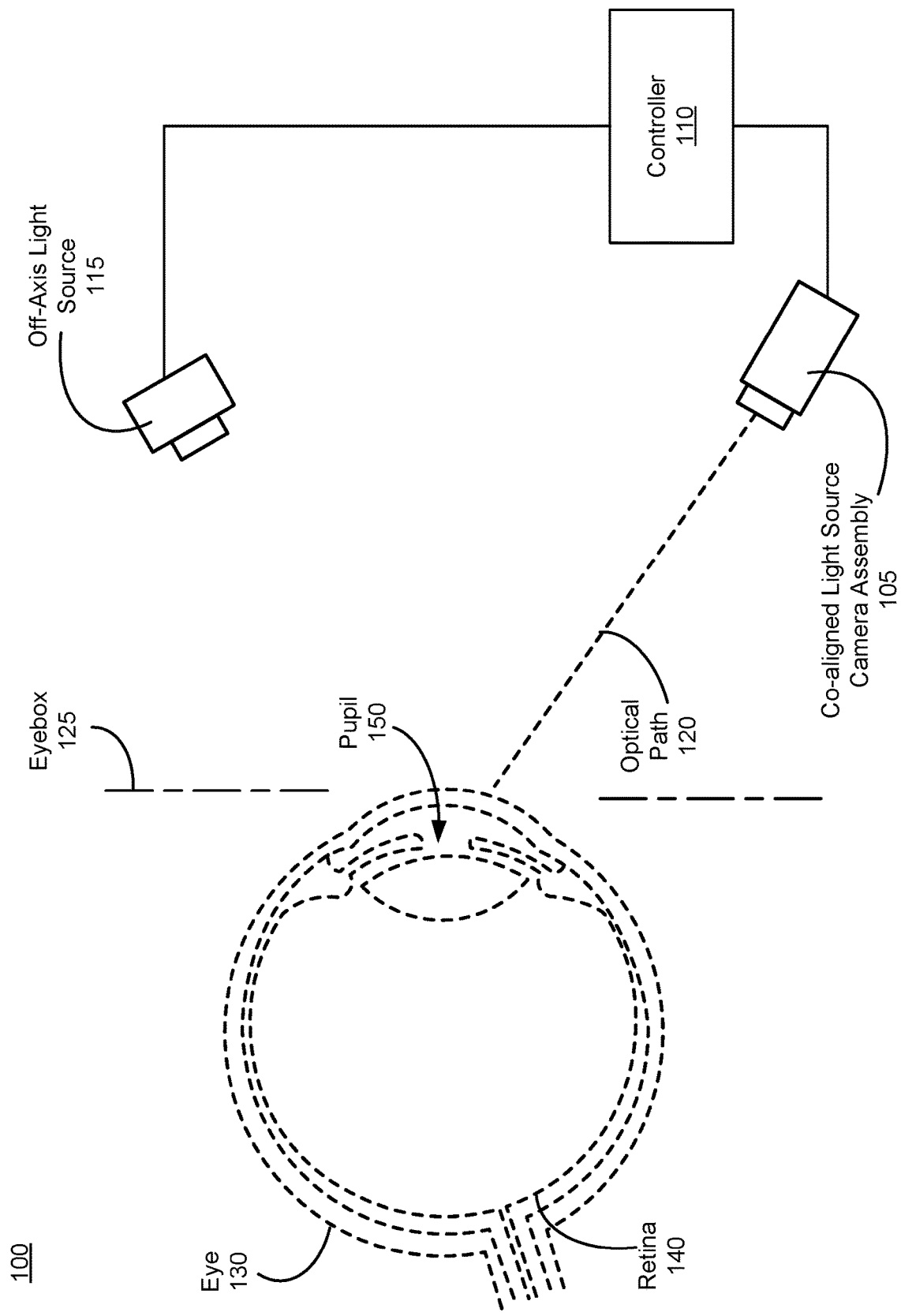
FIG. 1 is a differential camera system for differential pupil detection, in accordance with one or more embodiments.

The figures depict various embodiments for purpose of illustration only. One skilled in the art will readily recognize from the following discussion that alternative embodiments of the structures and methods illustrated herein may be employed without departing from the principles described herein.

DETAILED DESCRIPTION

Described herein is a tracking system that uses a differential camera system with one or more co-aligned light source camera assemblies (co-aligned LSCAs). The system may be used to, e.g., produce a high-contrast image of a pupil segmented from the background by exploiting the bright pupil reflex of the eye. When a light source hits the eye, the light that enters the pupil reflects off the curved retina such that the light returns to the source, which may be located at or near ("co-located") to the camera sensor. This gives a characteristic bright pupil image in which the pupil is seen as high intensity values. In contrast, light from an off-axis source does not reflect off the retina to reach the camera, and instead produces a dark pupil image in which the pupil is seen as low intensity values relative to the rest of the image of the eye. Light from the off-axis source reflects off other portions of the eye and surrounding facial features to reach the camera sensor. Light generated by the off-axis source may specularly reflect off of the inner and outer corneal surfaces, known as corneal glints, and the detected light will generate events on the differential camera system. The detected light reflected off the other portions of the eye and surrounding areas may stay constant or increase by minimal amounts in response to illumination of the pupil from the co-aligned light source, which may not result in events at these locations. The bright and dark pupil images may be subtracted to produce a high contrast image that only includes the pupil. With a traditional camera, this approach requires two separate images to be captured, which cannot be done sufficiently fast in practice to produce robust images of the pupil given the high speed of eye movements. By combining this technique with a differential camera system, the system is able to capture and isolate only the changes in the eye image at the instant the illumination is switched between various bright pupil (co-aligned light source) and dark pupil (off-axis light source) combinations. This yields events that show only the high-contrast change in the pupil itself, greatly simplifying down-stream processing on the image output, especially compared to the complicated architecture usually required to analyze event camera system feeds.

The co-aligned light source camera assembly (LSCA) is implemented to effectively capture the bright pupil image and corneal glints. The co-aligned LSCA is implemented such that the angle between optical path of the of the image sensor and optical path of an IR light source is kept sufficiently small such that they can overlap. The co-aligned LSCA may be implemented in various configurations. For example, a light source (e.g., infrared) and an image sensor of the differential camera may be mounted side-by-side with a sufficiently small center-to-center spacing. The co-aligned LSCA may include different combinations of optical devices (e.g., pinhole) and optical mixers (e.g., beam splitter) to minimize the center-to-center spacing and align the optical paths.

The controller is configured to perform smart sampling. The controller instructs the differential camera to obtain one or more data samples, which describe movement of an eye of the user. The controller calculates metrics of the movement of the eye based on the obtained data samples. Some examples of metrics may include gaze coordinates, gaze direction, rotational velocity, acceleration of the pupil, angle of rotation of the pupil, and pupil jitter. The controller applies a model (e.g., mathematical model, machine-learned model) to the calculated metrics of the movement of the eye to predict a time to obtain a next data sample and instructs the differential camera to obtain the next data sample at the predicted time.

Conventional object trackers often use RGB and/or IR cameras and some sort of depth determination technique (e.g., time-of-flight, stereo, structured light, etc.). However, the cameras in conventional systems read out each image frame, and objects are tracked by processing each of the image frames. Accordingly, bandwidth requirement and/or power budgets can be relatively high for conventional object trackers. In contrast, the differential camera described herein asynchronously outputs data samples for pixels based on some threshold amount of change in brightness (v. continuously reading out the entire image frame. This enables the differential camera system to operate at lower energy and computational power requirements. Additionally, latency is improved due to eliminating the need to process an entire image for object tracking.

FIG. 1 is a differential camera system 100 for differential pupil detection, in accordance with one or more embodiments. The differential camera system 100 described herein may also be referred to as a "tracking system" and/or an "object tracking system." The differential camera system 100 may be integrated within a mobile device, a stand-alone device, a headset, a computer, a car dashboard, a television, some other system that uses object tracking, or some combination thereof. The differential camera system 100 includes at least one camera assembly 105 ("camera assembly 105"), a controller 110, and may optionally include one or more off-axis IR light sources (e.g., off-axis light source 115). In some embodiments, the camera assembly 105 may comprise a co-aligned light source and be referred to as a co-aligned light source camera assembly (LSCA).

A light source of the co-aligned LSCA 105 may emit and receive light along an optical path 120. The co-aligned LSCA 105 may include one or more infrared (IR) light sources (may be referred to as co-aligned IR source(s)) and one or more differential cameras. The one or more IR light sources may be, e.g., a light emitting diode (LED), a vertical cavity surface-emitting laser (VCSEL), some other IR or near IR light source, or some combination thereof. The one or more IR light sources generally are configured to emit light in the IR and/or near IR band. In some embodiments, there are a plurality of IR light sources, and at least two of the IR light sources emit in different optical bands. The one or more IR light sources are configured to emit pulses of IR light in accordance with instructions from the controller 110. The emitted pulses of light are directed such that they propagate along the optical path 120 toward an eye box 125. The eye box 125 is a region in space that would be occupied by an eye 130 of a user and may also include surrounding facial features, such as the eyelashes and skin surrounding the eye 130.

The co-aligned LSCA 105 emits and receives light along an optical path 120. The co-aligned LSCA 105 includes one or more infrared (IR) light sources (may be referred to as co-aligned IR source(s)) and one or more differential cameras. The one or more IR light sources may be, e.g., a light emitting diode, a vertical cavity surface-emitting laser (VCSEL), some other IR or near IR light source, or some combination thereof. The one or more IR light sources generally are configured to emit light in the IR and/or near IR band. In some embodiments, there are a plurality of IR light sources, and at least two of the IR light sources emit in different optical bands. The one or more IR light sources are configured to emit pulses of IR light in accordance with instructions from the controller 110. The emitted pulses of light are directed such that they propagate along the optical path 120 toward an eye box 125. The eye box 125 is a region in space that would be occupied by an eye 130 of a user.

The co-aligned LSCA 105 may be co-aligned in the sense that the optical one or more IR light sources are substantially aligned with the optical paths for the one or more differential cameras. The angle between optical paths of the of the one or more differential cameras and optical paths of the one or more IR light sources is kept sufficiently small such that they can essentially overlap to form the optical path 120. Light emitted from the one or more IR light sources travels to the eye 130 and reflects from a retina 140 back along the optical path 120 to the one or more IR light sources and the one or more differential cameras. The optical paths may be aligned to form the optical path 120 in a variety of ways. For example, a beam-splitter or other optical mixing device within the co-aligned LSCA 105 may be used to align the optical paths, the one or more IR light sources and the one or more differential cameras can be mounted side-by-side in the co-aligned LSCA 105 with a sufficiently small center-to-center spacing, the one or more IR light sources and the one or more differential cameras may share a common substrate within the co-aligned LSCA 105 (e.g., a substrate with IR illumination pixels and sensing pixels interleaved), the one or more IR light sources may be coupled along the optical path to an optical element, such as a lens, or some combination thereof. The co-aligned LSCA 105 may also incorporate various optical filters including a band-pass filter specific to the wavelength of the light sources, a spatially-varying bandpass filter in the case of interleaved illumination and differential camera pixels, or some combination thereof. Various examples of co-aligned LSCAs are shown and described below with regard to FIGS. 4A-7B.

The IR light is reflected from the retina 140, and the reflected light propagates back along the optical path 120 toward the differential camera within the co-aligned LSCA 105 for detection. The one or more differential cameras (also commonly referred to as a dynamic vision sensor) are configured to detect an intensity value corresponding to IR light reflected from the eye 130 along the optical path 120. A differential camera, of the one or more differential cameras, includes a plurality of photodiodes, and each photodiode is configured to asynchronously output a data sample that is based at least in part on a difference of a data sample previously output by the photodiode and the intensity value detected by the photodiode relative to an intensity threshold value.

The one or more off-axis light sources emit light off-axis from the optical path 120 in accordance with instructions from the controller 110. The one or more off-axis light sources include the off-axis light source 115. An off-axis light source may be, e.g., a light emitting diode, a vertical cavity surface-emitting laser (VCSEL) some other IR or near IR light source, or some combination thereof. An off-axis light source is configured to emit light in the IR and/or near IR band. In some embodiments, the one or more off-axis light sources emit light at a same wavelength as the one or more IR sources of the co-aligned LSCA 105. In some embodiments, there are a plurality of off-axis light sources, and at least two of the off-axis light sources emit in different optical bands. The one or more off-axis light sources may be configured to emit pulses of IR light in accordance with instructions from the controller 110. The emitted pulses of light are directed such that they propagate toward the eye box 125 along an optical path that is separate from the optical path 120. Note that in some embodiments, there are no off-axis light sources that are part of the differential camera system 100, instead off-axis light is ambient light, and the one or more off-axis sources are the light sources that generate some or all of the ambient light.

The controller 110 controls components of the differential camera system 100. The controller 110 may, e.g., control the activation and intensity of the one or more IR light sources, control the activation and intensity of the off-axis light source 115, and control the threshold settings and frame capture enable for the one or more differential cameras. The one or more IR light sources and the one or more differential cameras may be part of a single co-aligned LSCA 105 and/or part of several co-aligned LSCA 105 (e.g., one co-aligned LSCA 105 for each eye of the user). The controller 110 may adjust the intensity settings of the light sources (i.e., the one or more IR light sources and/or the off-axis light source 115), pulse length of the light sources, and threshold settings of the one or more differential cameras dynamically according to the data samples from the one or more differential cameras; one or more separate external sensors (e.g., such as an ambient light sensing photodiode or a traditional camera imager also capturing images of the eye), or some combination thereof. For example, the controller 110 may implement a dynamic sampling module which triggers different system (e.g., lighting or sensor exposure) configurations based on the state of the differential camera system. In some embodiments, the controller 110 may predict a timing of when to obtain a next sample based on data from previous samples to maximize the amount of new information per sample. For example, the controller 110 may be configured to dynamically adjust a sampling rate of the differential camera system 100 based on previously captured data samples. The controller 110 may obtain samples at irregular time intervals to capture a large (and in some cases maximum) amount of new information per sample. This may reduce power consumption of the differential camera system 100 by reducing the number of generated events, the time which the light sources are activated, the number of times that the gaze location is computed, or some combination thereof. This is described in further detail in FIG. 3.

In some embodiments, the controller 110 may implement a smart wake-up function. The controller 110 may be configured to determine the state of the differential camera system 100 based on computed high-level attributes of data samples. Some examples of high-level attributes may include a number of generated data samples, an average pixel position of the generated data samples, and a frequency of generated data samples occurring at given pixel locations. In some embodiments, the co-aligned light source camera assembly 105 may include an event sensor (or dedicated wake-up sensor) configured to calculate high-level attributes of the generated samples.

The controller 110 may set the differential camera system 100 to an active state or a sleep state. The active state may be triggered when the high-level attributes increase beyond a predetermined threshold. Similarly, the differential camera system 100 may transition to the sleep state when the high-level attributes decrease below the predetermined threshold. For example, if the controller 110 detects an increase in the number of generated data samples beyond a threshold, the controller 110 triggers a transition from the sleep state to the active state. In some embodiments, the active state may be triggered when there is a change observed in the high-level attributes. Similarly, the differential camera system 100 may go to sleep when there is no change in the high-level attributes.

The controller 110 may implement different system configurations based on the state of the differential camera system 100. The different system configurations may include different processing, lighting, and/or sensor exposure configurations. For example, in active state, the controller 110 may be configured to compute a gaze location for every generated sample. Whereas in the sleep state, the controller 110 may compute high-level attributes for the generated samples. In another example, the controller 110 may implement different lighting configurations based on the state of the differential camera system 100. For example, in active state, the controller 110 may instruct the one or more light sources to emit light at regular intensity during sampling, while in sleep state, the controller 110 may disable one or more of the light sources or reduce the intensity of the light sources. In another example, in sleep state, the controller 110 may instruct the light sources to emit pulses of light in a different sequence compared to when in active state. The controller 110 may implement different sensor exposure states based on the state of the differential camera system 100. For example, in active state, the event sensor may be configured to detect events generated by the pupil or corneal reflections, while in sleep state, the event sensor may be configured to detect changes caused by illumination by the light sources or ambient illumination, or motion in the scene such as any eye movement, blinks, or changes in facial expression.

In some embodiments, the controller 110 may be configured to deactivate one or more system components in the sleep state, such as the light sources, the system processor, the radio components (e.g., Bluetooth, Wi-Fi), or specific components of the differential camera (e.g., analog core, digital core, data off-link).

The controller 110 may synchronize the activation of each light source (i.e., the one or more IR light sources and/or the off-axis light source 115) with the activation of the one or more differential cameras, enabling the one or more differential cameras to generate and output data samples in a time window corresponding to a specific configuration of the illumination settings. For the example of a mobile device, the differential camera system may comprise one or more differential cameras and a plurality of off-axis light sources, located along the periphery of a device. In some embodiments, the one or more differential cameras have corresponding on-axis lights sources (e.g., as part of one or more co-aligned LSCAs). In some embodiments, the controller 110 may instruct an on-axis light source to emit one or more pulses of IR light (e.g., for eye tracking). The controller 110 may then instruct the off-axis light sources to emit one or more pulses of IR light in a fixed order, one at a time, to illuminate different portions of a face or eye of a user. In some embodiments, the controller may enable one or more light sources in clockwise order, or anti-clockwise order, or in any other suitable pattern. This is further described by FIGS. 9A and 9B. In some embodiments, the controller 110 may enable the light sources in a dynamic manner, based in part on data sample(s) output of the differential camera.

In some embodiments, the differential camera system may be configured to provide depth information. The differential camera system may comprise a plurality of co-aligned LSCAs 105. The plurality of co-aligned LSCAs 105 are offset from each other such that in addition to eye tracking—data captured by the plurality of co-aligned LSCAs 105 may be used to determine depth information (e.g., may be derived using stereo techniques). This is further described by FIG. 5.

In some embodiments, the differential camera system may be used for object tracking. For example, the differential camera system may comprise a differential camera and a plurality of off-axis light sources. In this case, the controller 110 may enable the off-axis light sources one at a time in a sequential order, or one or more off-axis light sources at a time in a sequential order, to illuminate an object. The differential camera detects changes in brightness of the object caused in part by the pulses of light from the various off-axis light sources. The controller 110 may track the object based on the detected changes in brightness of the object. This is further described by FIGS. 11A and 11B.

The controller 110 reads data samples from the one or more differential cameras. The controller 110 may process the data samples to identify a pupil of the eye or the corneal reflections. The controller 110 may determine eye orientation and/or gaze location of the eye based on the identified pupil and, in some embodiments, the corneal reflections generated by the off-axis light sources.

In some embodiments, the differential camera system 100 may be configured to detect the presence and location of eyes within a room. For example, the differential camera system 100 may be located at a fixed position within a room. In some embodiments, the differential camera system 100 may comprise integrated co-aligned and/or off-axis illuminators. In some embodiments, the differential camera system 100 may comprise off-axis illuminators at different locations within the room. The differential camera system 100 may be integrated within, for example, a television, phone, sign, or computer. The controller 110 may be configured to identify any pupils of eyes within the field of view of the differential camera system. The controller 110 may determine a number of pupils detected within the room as well as a general gaze direction of the pupils, such as whether the pupils are looking in the direction of the differential camera system 100. Detecting the bright pupils with the differential camera system 100 may utilize much less processing power than processing full images to detect pupils. Room-scale tracking may be used for many applications, such as people counting, attention tracking, privacy preserving measures, or any other suitable scenario in which it may be beneficial to detect eyes.

Figure 11A:
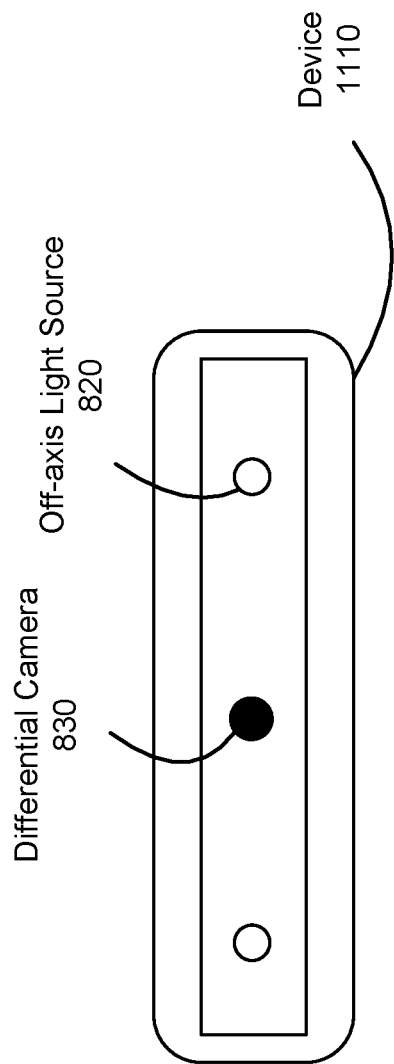
FIG. 11A is a perspective view of a device including a differential camera system for object tracking, in accordance with one or more embodiments.
Figure 11B:
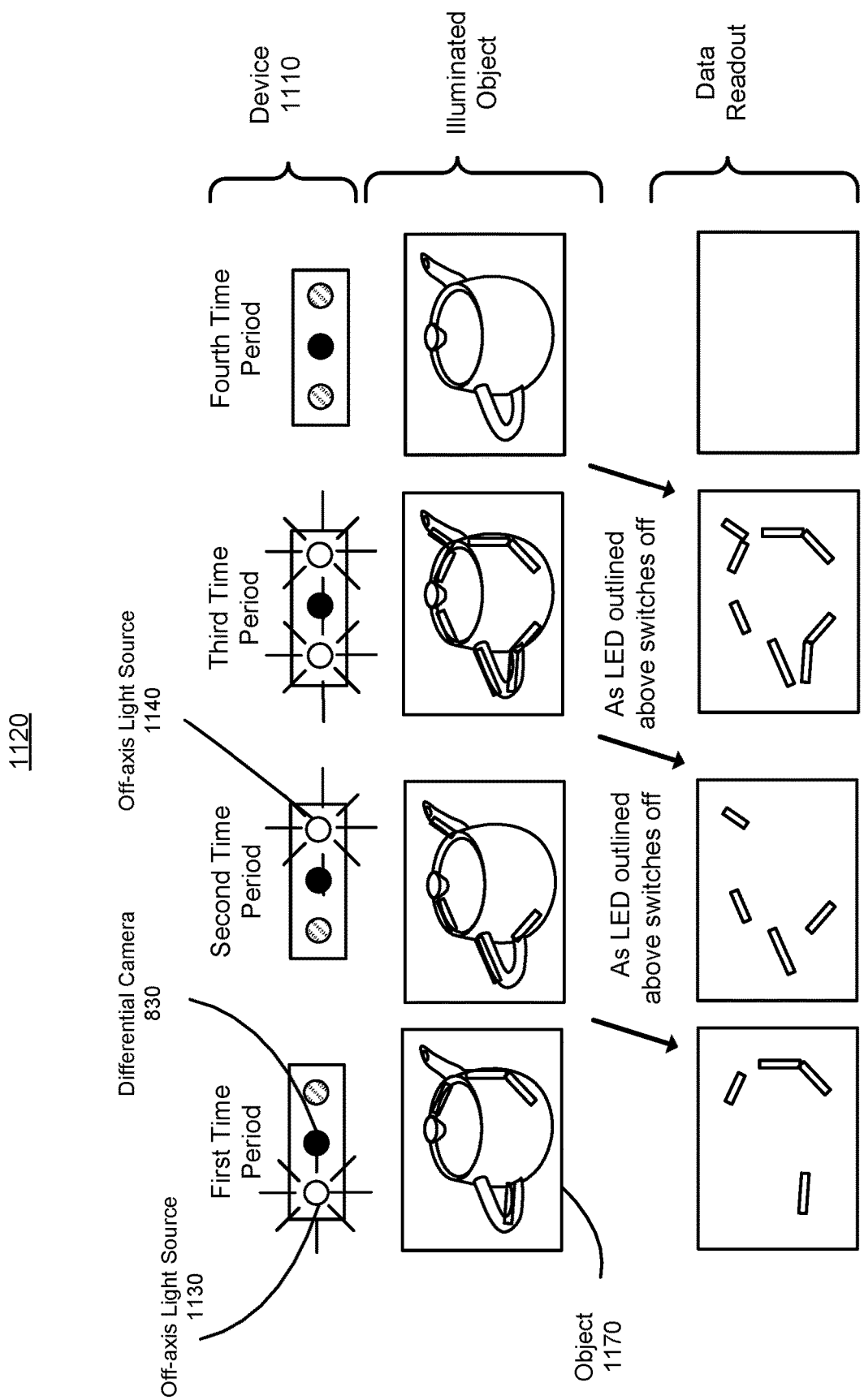
FIG. 11B is an example depicting object tracking using the differential camera system of FIG. 11A.

Note that while the object being tracked in the depicted example are the user's pupils, the differential camera system 100 can be modified to track objects such as, but is not limited to, a user's face (e.g., as described in detail below with regard to FIGS. 9A, 9B, 9C), a user's hand or some other physical object (e.g., as described in FIGS. 11A and 11B).

Figure 2A:
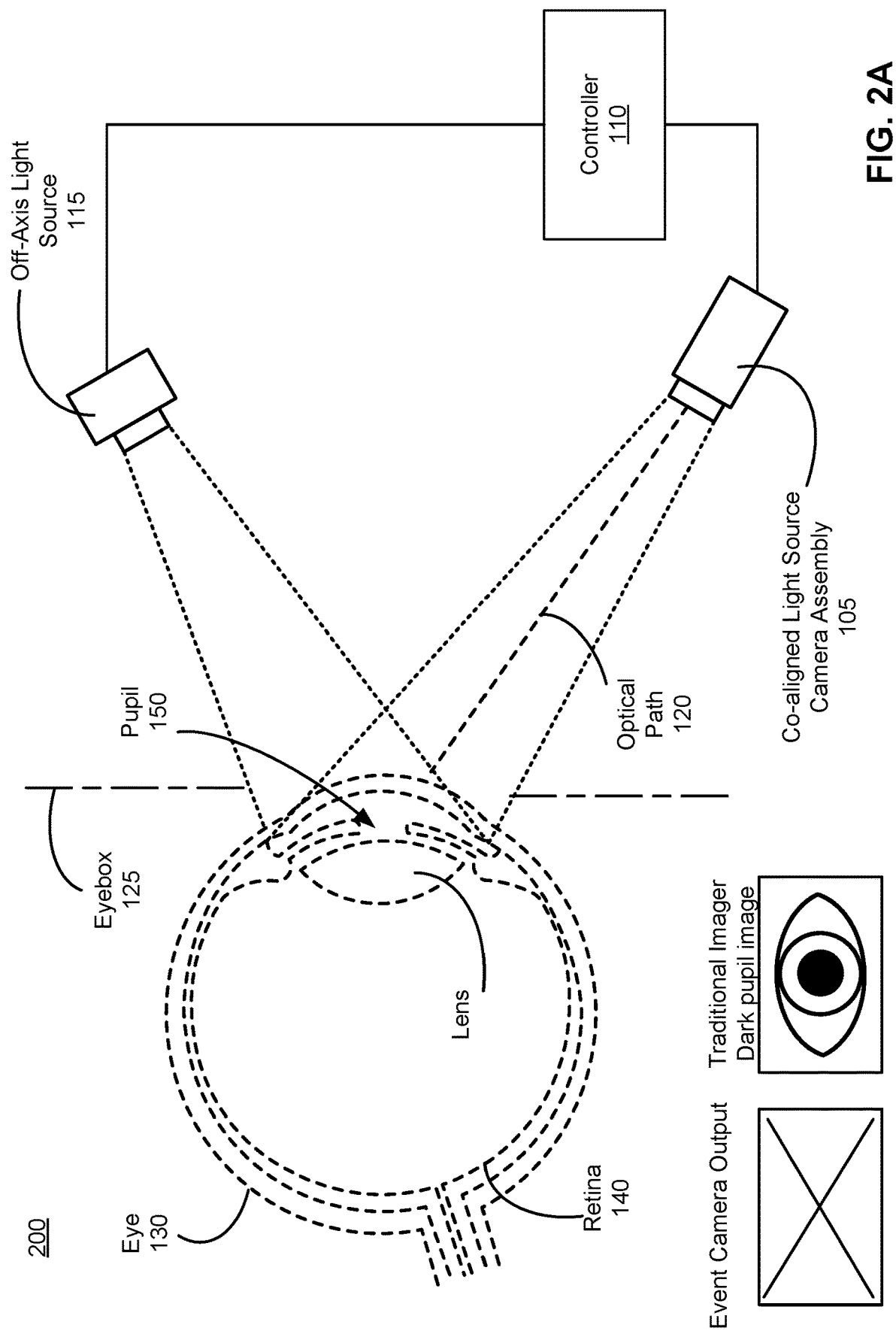
FIG. 2A is the differential camera system of FIG. 1 at a first time period, in accordance with one or more embodiments.

FIG. 2A is the differential camera system of FIG. 1 at a first time period, in accordance with one or more embodiments. In this first time period, the controller 110 activates the off-axis light source 115 and enables the differential camera to output image data. Light from the off-axis light source 115 that reaches the pupil 150 and hits the retina 140 at the back of the eye 130 will reflect back through the pupil 150 to the light source, in this case at the off-axis light source 115 location. Some or all of this light will not reach a differential camera at the co-aligned LSCA 105, while the rest of the light that reaches the eye box 125 will reflect in all directions, including reaching the co-aligned LSCA 105. In a traditional imager this would produce a dark pupil image in which most features in the eye box 125 are brightly illuminated, but the pupil 150 itself has relatively low intensity values due to the pupil aperture largely rejecting reflections off of the retina 140 that are not along the incoming light path. In some embodiments, the output of the differential camera is discarded at this time period, while in other embodiments the off-axis light source 115 may be turned on sufficiently long for the output of the differential camera to show no changes. Note that pixels of the differential camera responsive to a constant input do not output a data sample or output a no-change value. In some embodiments the off-axis light source 115 activation in this time period may be neglected entirely.

In some embodiments, while the off-axis light source 115 is activated, the controller 110 may switch the co-aligned LSCA 105 from the deactivated state to the activated state. The pixels of the differential camera may detect a change in the light reflected by the retina and through the pupil 150 back to the co-aligned LSCA 105. Due to the light from the off-axis light source 115 being reflected by areas other than the pupil, the pixels of the differential camera may not detect an event at locations other than the pupil. Thus, the differential camera may output a bright pupil image.

Figure 2B:
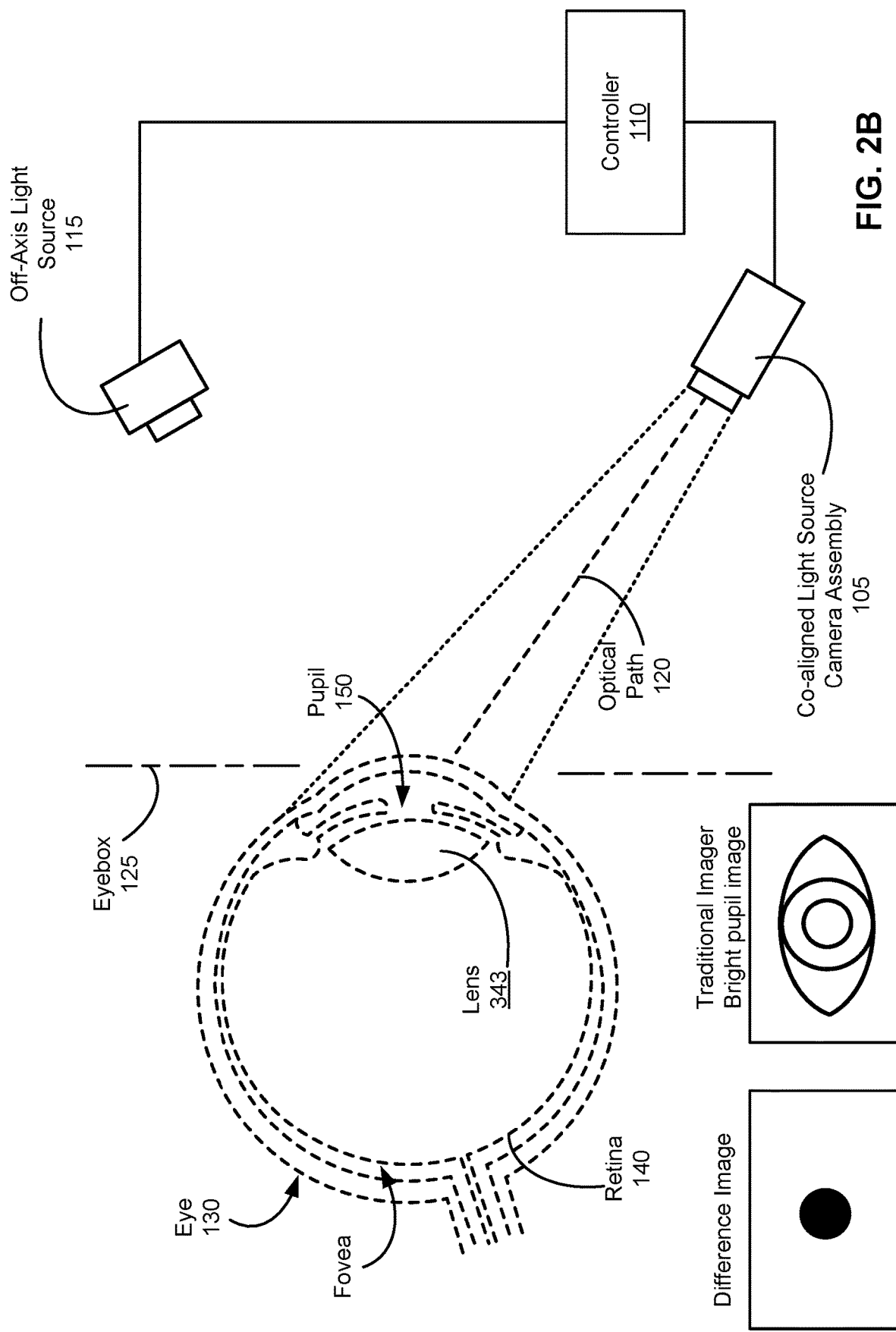
FIG. 2B is the differential camera system of FIG. 1 at a second time period, in accordance with one or more embodiments.

FIG. 2B is the differential camera system of FIG. 1 at a second time period, in accordance with one or more embodiments. In this second time period, the off-axis light source 115 is deactivated by the controller 110, and the one or more IR light sources in the co-aligned LSCA 105 are activated by the controller 110, and the differential camera is enabled to output data samples. Light from the one or more IR light sources that reach the pupil 150 will reflect from the retina 140 in the back of the eye 130 and pass back through the pupil 150 along the optical path 120 to the one or more differential cameras of the co-aligned LSCA 105. The rest of the light that reaches the eye box 125 reflects in all directions, including along the optical path 120 of the co-aligned LSCA 105. Because the majority of the light that enters the pupil 150 is reflected back to the co-aligned LSCA 105, the pupil 150 would appear relatively bright in a traditional imager compared to the rest of the image of the eye, producing a "bright pupil image." However, in a differential camera, the transition from a "dark pupil" from the previous (first) time period characterized by the activation of the off-axis light source 115, to the "bright pupil" in this current (second) time period characterized by the activation of the co-aligned light source produces a pronounced difference image described by the data samples output by the one or more differential cameras. The difference image is localized to a region of including the pupil 150.

In some embodiments, the co-aligned LSCA 105 may detect glints, or specular reflections, from one or more light sources reflecting off a surface of the eye 130. The light sources may be the off-axis light source 115, the co-aligned light source of the co-aligned LSCA 105, or any other suitable light source. The controller 110 may analyze the glints in combination with the bright pupil image to determine a position of the eye 130. Different light sources may be strobed at different frequencies. The controller 110 may determine that a glint detected at a first location corresponds to a first light source based on the frequency of the detected glint. A light source causing a glint may be referred to as a glint light source. Similarly, the controller 110 may determine that a glint detected at a second location corresponds to a second light source based on the frequency of the detected glint at the second location. In other embodiments, all the glint light sources may strobe at the same frequency and have uniquely identifying offsets in phase relative to another signal like the strobing of the co-axial LED. This corresponds to the glint light sources simply being staggered in time. For example, the first light source may turn on 200 microseconds after the co-axial LED is turned off. The controller 110 can look for a peak of events 200 microseconds after the co-axial LED is turned off in the event stream to uniquely identify the location of the first light source.

In some embodiments, the controller 110 processes information from the differential camera system that describes pupil movement information detected by the differential camera. The controller 110 may be configured to dynamically configure the functionality of the various components of the differential camera system based on the detected eye movement of a user.

FIG. 3 is a flowchart illustrating an example process 300 for smart sampling, in accordance with one or more embodiments. The process 300 may be performed by the controller 110. Alternative embodiments may include more, fewer, or different steps from those illustrated in FIG. 3, and the steps may be performed in a different order from that illustrated in FIG. 3.

The controller 110 instructs 310 a differential camera to obtain one or more data samples. The one or more data samples describe movement of an eye of the user. For example, the controller 110 can instruct the co-aligned LSCA and the off-axis light sources to perform the process described in FIGS. 2A and 2B. The controller 110 receives data samples generated by the differential camera in response to detected changes in brightness. The data samples describe a movement of an eye. The sample may include the location of the sample (e.g., pixel coordinates), the timestamp, and magnitude of change in intensity of each pixel. At start up, the controller 110 may instruct the light sources to emit pulses of light towards the eye at an initial sampling rate over a duration of time.

The controller 110 calculates 320 metrics of the movement of the eye based on the data samples. The smart sampling module may use a previous N number of samples to calculate the metrics of the movement of the eye, where N is an integer. The metrics may include gaze coordinates, gaze direction, rotational velocity, acceleration of the pupil, angle of rotation of the pupil, and pupil jitter.

The controller 110 applies 330 a model to the calculated metrics of the movement of the eye to predict a time to obtain a next data sample. For example, a pupil with a high rotational velocity may indicate the occurrence of an eye saccade. The model may predict shorter time intervals between samples in response to a detected eye saccade to capture the rapid eye movement. In contrast, if no eye saccade is detected, the controller 110 may maintain the initial sampling rate or decrease the sampling rate. Hence, computation power and illumination power are reduced. In other embodiments, the controller 110 may also predict a landing position of an eye saccade.

The model described herein may refer to a predictive mathematical model or a machine-learned (ML) model used to determine the timing of the next sample based on the eye movement data and calculated metrics of the eye movement. Some examples of predictive mathematical models include, and are not limited to, linear regression models, time series models, logistic regression models, or Markov Chain models. The machine-learned model may be trained using various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

The controller 110 instructs 340 the differential camera to obtain the next data sample at the predicted time. Steps 310 through 330 are repeated to predict future sample times based on the most recent N number of samples.

FIGS. 4A-7B depict cross-sectional views of example co-aligned LSCAs. The co-aligned LSCAs depicted in FIGS. 4A-7B are embodiments of the co-aligned LSCA 105.

Figure 4A:
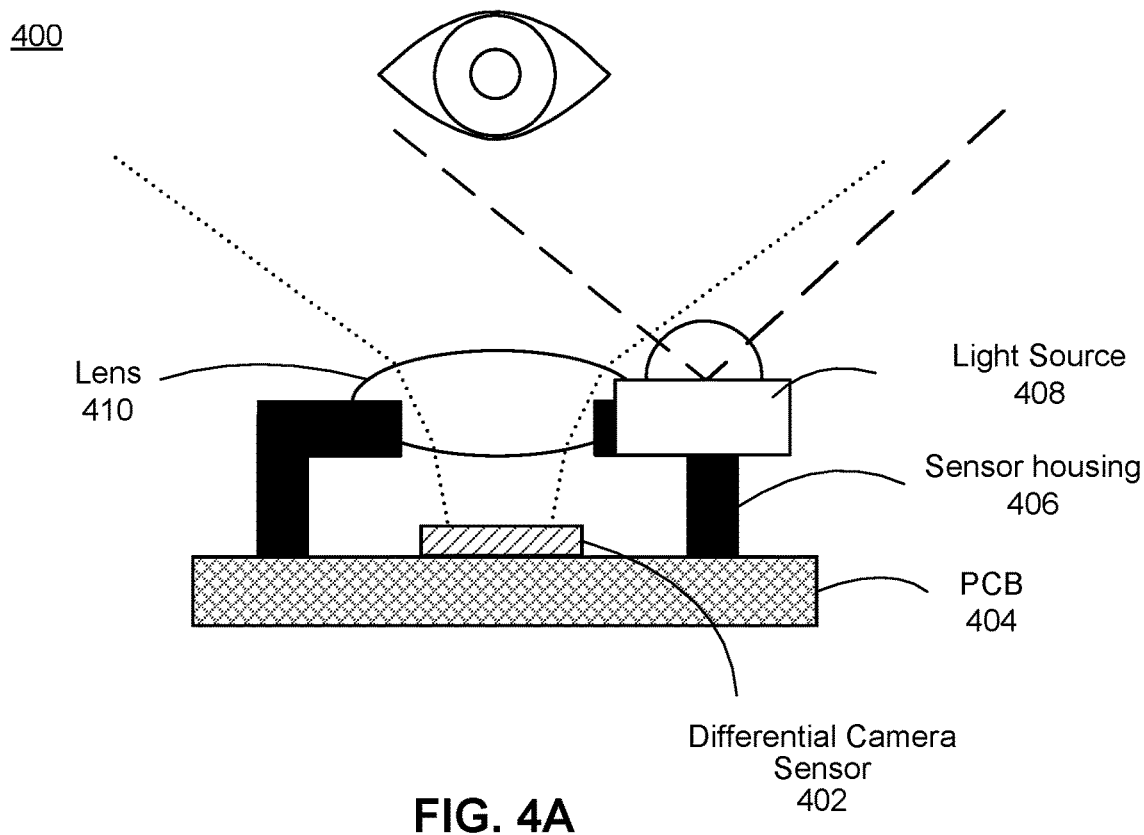
FIG. 4A is an example cross section of a co-aligned light source camera assembly in a lens-light source side-by-side configuration, in accordance with one or more embodiments.

FIG. 4A is an example cross section of a co-aligned LSCA 400 in a lens-light source side-by-side configuration, in accordance with one or more embodiments. The co-aligned LSCA 400 includes a differential camera sensor 402, a printed circuit board (PCB) 404, a sensor housing 406, a light source 408, and a lens 410. In other embodiments, the co-aligned LSCA 400 includes different or additional elements. In addition, the functions may be distributed among the elements in a different manner than described.

The differential camera sensor 402 is configured to detect light emitted by the light source 408, and in some cases other light sources (e.g., off-axis light source). The detected light is reflected from an object (e.g., eye positioned in an eye box) in a local area of the co-aligned LSCA 400. The differential camera sensor 402 includes a plurality of photodiodes, each photodiode configured to asynchronously output a data sample that is based at least in part on a difference of a data sample previously output by the photodiode and the intensity value detected by the photodiode relative to an intensity threshold value. The differential camera sensor 402 is coupled to a PCB 404.

The sensor housing 406 may be configured to partially enclose the differential camera sensor 402. The sensor housing 406 may provide a controlled environment for the differential camera sensor 402. The sensor housing 406 includes an aperture that is positioned between the differential camera sensor 402 and the local area (e.g., eye box). In the illustrated embodiment, the lens 410 is positioned within the aperture. As shown, the sensor housing 406 provides structural support to the light source 408 and the lens 410. The lens 410 focuses light from a local area of the co-aligned LSCA 400 on to the differential camera sensor 402. The sensor housing 406 may also include a lens holder (not shown) within the aperture that is configured to hold the lens 410 over the differential camera sensor 402. The sensor housing 406 is configured to be opaque to light in a same optical band as light emitted from the light source 408.

The light source 408 is configured to emit pulses of light along an optical path toward an object (e.g., an eye). The light source 408 may be positioned adjacent to the lens 410 and on top of the sensor housing 406. The light source 408 and the lens 410 are in a side-by-side configuration—which may be referred to as a lens-light source side-by-side configuration. Note that a distance between the light source 408 and the lens 410 (e.g., on the order of a millimeter) is quite small relative to a distance between the co-aligned LSCA 400 and the object (e.g., more than 25 mm). As such, the light source 408 is substantially co-aligned with the differential camera sensor 402—and may be referred to as an on-axis light source. As described in FIG. 1, the optical path of the on-axis light source 408 is substantially aligned with the optical path of the differential camera sensor 402 (e.g., to capture the light reflected off the user's retina). The light source may be, e.g., an LED, a VCSEL, some IR or near IR light source, or some combination thereof. In some embodiments, the co-aligned LSCA 400 may include additional light sources that are positioned adjacent to the lens 410 to mitigate chances of a crescent shaped pattern forming at a perimeter of the pupil. For example, four on-axis light sources may be placed equidistant around the circumference of the lens 410.

Figure 4B:
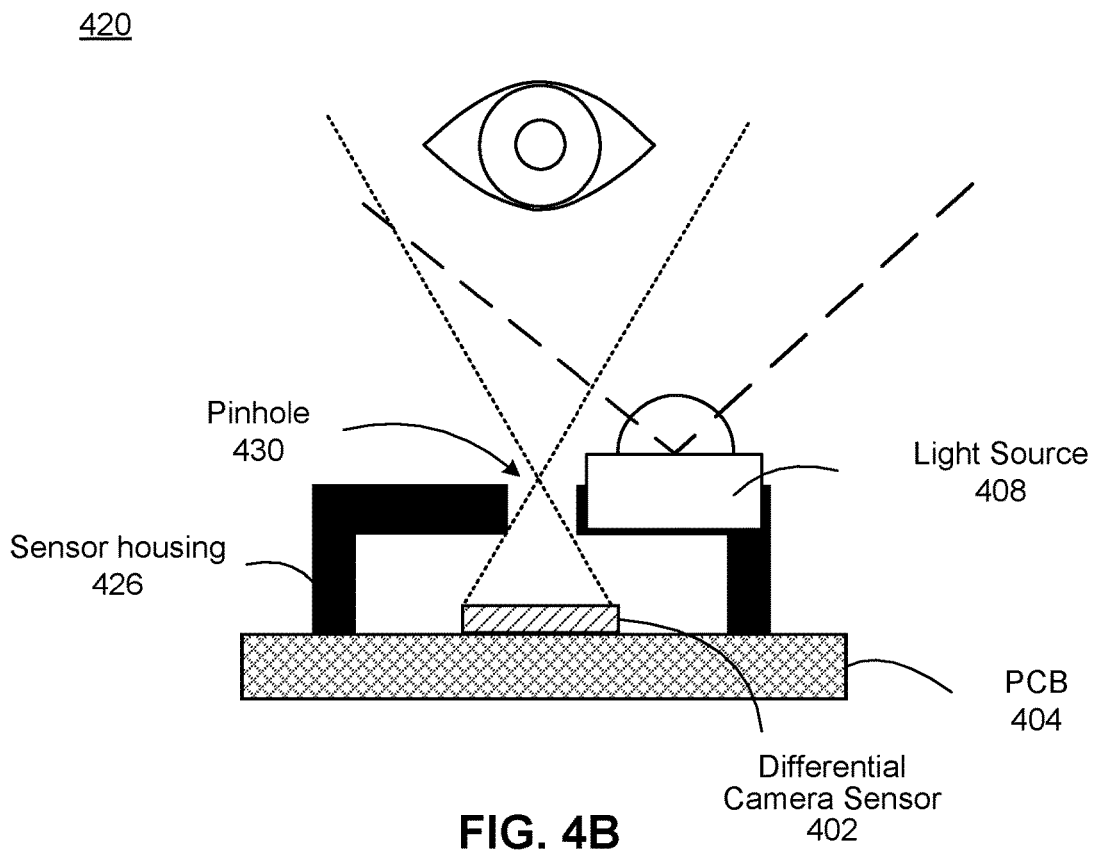
FIG. 4B is an example cross section of a co-aligned light source camera assembly in a pinhole-light source side-by-side configuration, in accordance with one or more embodiments.

FIG. 4B is an example cross section of a co-aligned LSCA 420 in a pinhole-light source side-by-side configuration, in accordance with one or more embodiments. The co-aligned LSCA 420 may be substantially the same as the co-aligned LSCA 400 except that the lens 410 has been replaced with a pinhole 430. In the illustrated embodiment, the aperture in the sensor housing 426 is the pinhole 430. The pinhole 430 functions to focus light from the local area onto the differential camera sensor 402. Note that a diameter of the pinhole 430 is smaller than that of the lens 410. This can reduce a form factor of the co-aligned LSCA 420 relative to that of the co-aligned LSCA 400. Additionally, it may reduce the crescent shaped pattern formed at the perimeter of the pupil.

In another embodiment (not shown), the light source 408 may be replaced with a bare die LED. The bare die LED may be wire bonded to a PCB positioned above the differential camera sensor 402, the PCB including a pinhole.

Figure 4C:
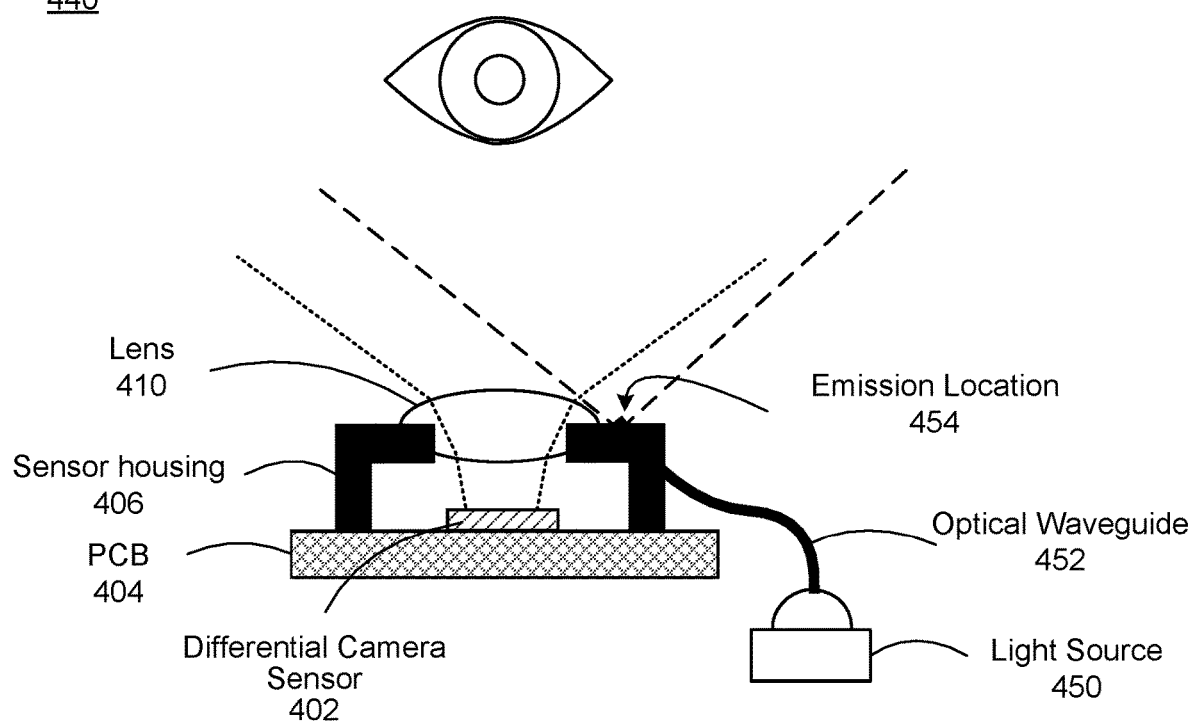
FIG. 4C is an example cross section of a co-aligned light source camera assembly with a remote light source, in accordance with one or more embodiments.

FIG. 4C is an example cross section of a co-aligned LSCA 440 with a remote light source 450, in accordance with one or more embodiments. The co-aligned LSCA 440 is substantially similar to the co-aligned LSCA 400 except that the light source 408 is no longer directly adjacent to the lens 410. The remote light source 450 may be substantially the same as the light source 408, but is simply remote from the sensor housing 406. In this embodiment, the remote light source 450 is coupled to an emission location 454 via an optical waveguide 452. The optical waveguide 452 acts as a conduit which transmits light generated by the light source 450 to the emission location 454 from which it is emitted into the local area. The optical waveguide 452 may be, e.g., an optical fiber, or some other optical waveguide. Note that the emission location 454 may be much smaller than the remote light source 450. As such, a form factor of the co-aligned LSCA 440 may be smaller than that of, e.g., the co-aligned LSCA 400. And in some embodiments (not shown), the lens 410 in the co-aligned LSCA 440 may be replaced with a pinhole (e.g., similar to that of FIG. 4B). And the use of the pinhole may further reduce a form factor of the co-aligned LSCA 440.

Figure 5:
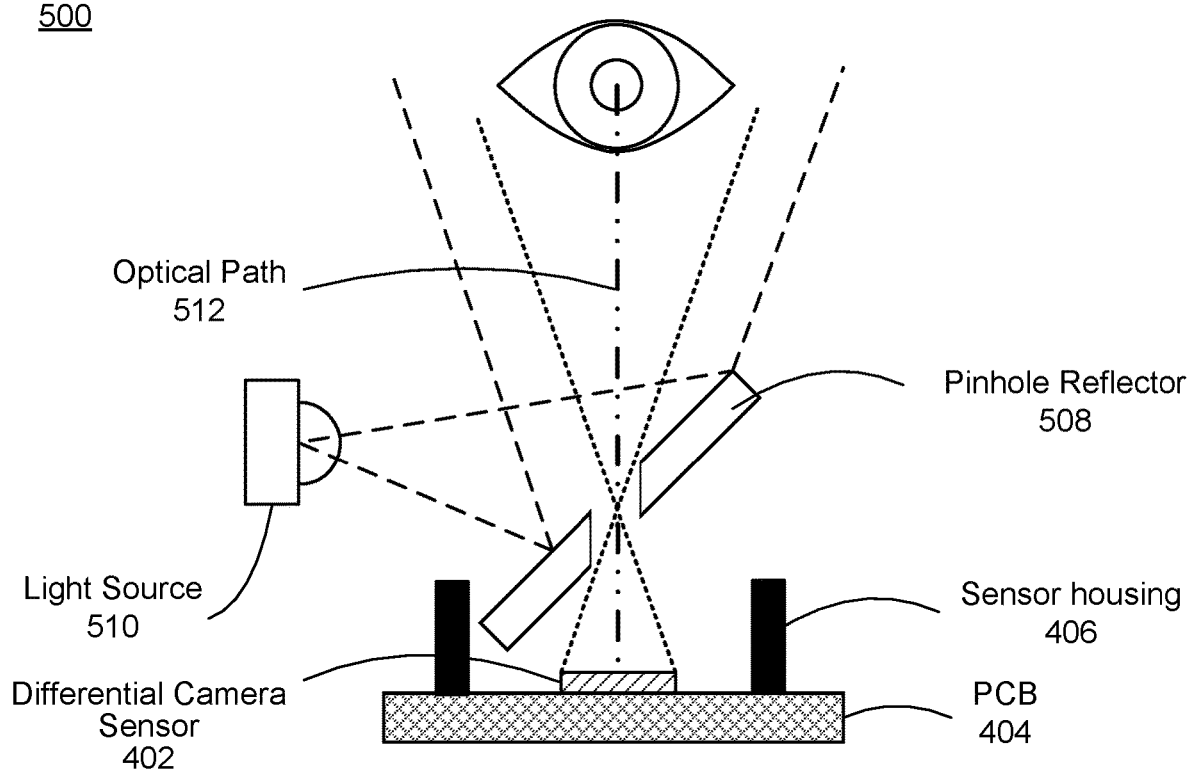
FIG. 5 depicts example co-aligned light source camera assembly that includes a pinhole reflector, in accordance with one or more embodiments.

FIG. 5 depicts a cross-sectional view of an example co-aligned LSCA 500 that includes a pinhole reflector 508, in accordance with one or more embodiments. The co-aligned LSCA 500 includes the differential camera sensor 402, the PCB 404, the sensor housing 406, a light source 510, and a pinhole reflector 508. The light source 510 may be substantially the same as the light source 408. In other embodiments, the co-aligned LSCA 500 includes different or additional elements. In addition, the functions may be distributed among the elements in a different manner than described.

The pinhole reflector 508 is configured to reflect light from a light source 510 towards an object (e.g., an eye) and direct light from a local area onto the differential camera sensor 402. The pinhole reflector 508 has a reflective surface with a small aperture (e.g., pinhole). The reflective surface is composed of a material (e.g., gold coating, silver coating, etc.) that is highly reflective of light in an optical band emitted by the light source 510 (e.g., near IR). The illustrated configuration of a pinhole reflector 508 and the light source 510 allows light from the light source 510 to be exactly co-aligned with an optical path 512 of the differential camera sensor 402. The light reflected off the user's eye is directed through the pinhole of the pinhole reflector 508 and onto the differential camera sensor 402 along the optical path 512. In some embodiments, the pinhole reflector 508 may include a diffused reflector. In the embodiment illustrated by FIG. 5, the pinhole reflector 508 is positioned at a 45-degree angle with respect to the optical path 512. In other embodiments, positioning of the light source 510 and/or the pinhole reflector 508 may be different from what is shown. For example, in other embodiments, pinhole reflector 508 may be positioned at a 60-degree angle with respect to an optical path 512.

Figure 6:
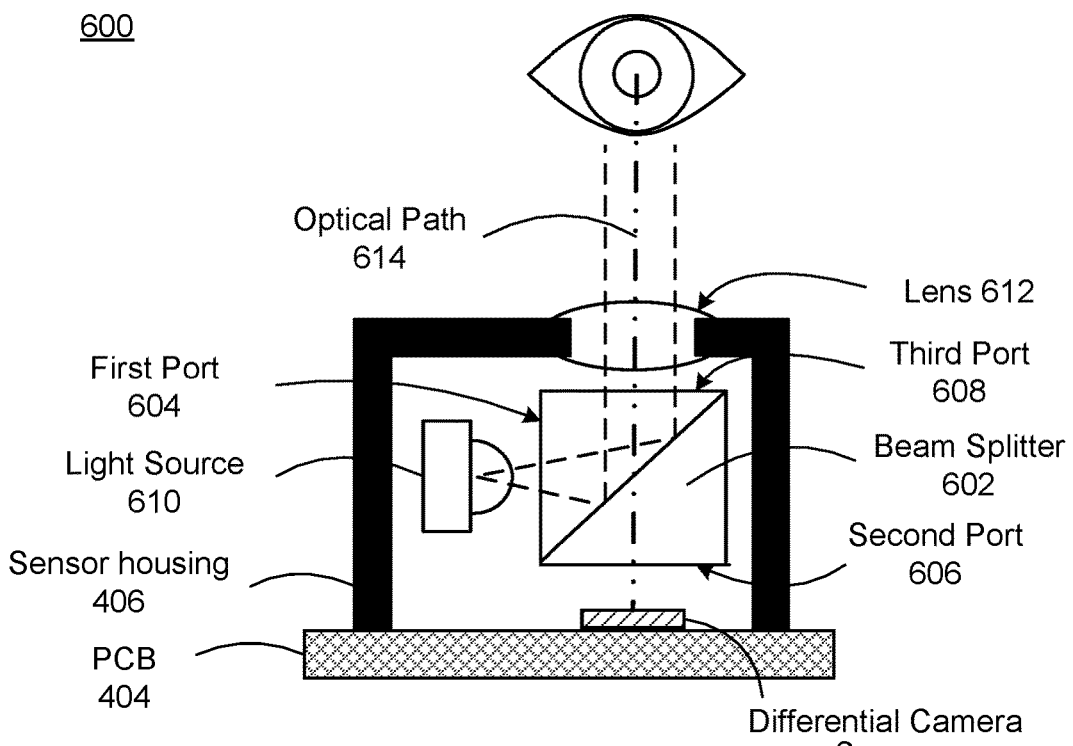
FIG. 6 depicts an example co-aligned light source camera assembly that uses a beam splitter, in accordance with one or more embodiments.

FIG. 6 depicts a cross-sectional view of an example co-aligned LSCA 600 with a beam splitter 602, in accordance with one or more embodiments. The co-aligned LSCA 600 includes the differential camera sensor 402, the PCB 404, the sensor housing 406, a lens 612, a light source 610, and the beam splitter 602 which. The co-aligned LSCA 600 operates similarly to the co-aligned LSCA 500 except that function of a pinhole reflector has been replaced with the beam splitter 602 and a lens 612. The light source 610 and the lens 612 may be substantially similar to the light source 408 and the lens 410, respectively. In other embodiments, the co-aligned LSCA 600 includes different or additional elements. In addition, the functions may be distributed among the elements in a different manner than described.

The beam splitter 602 passes received light from the light source 610 at a first port 604 and redirects at least a portion of the received light out of the beam splitter 602 at a third port 608 in a forward direction along an optical path 614 towards an object (e.g., an eye). A portion of the light returning from the object is received at the beam splitter 602 at the third port 608, and the beam splitter 602 directs a portion of the received light out of a second port 606 onto the differential camera sensor 402. This configuration allows an optical path of the light source 610 to be exactly co-aligned with the optical path 614 of the differential camera sensor 402 as it exits the second port 606 of the beam splitter 602. This helps ensure that the light from the light source 610 is retroreflected from a retina of the eye and that the retroflected light reaches the differential camera sensor 402.

As illustrated in FIG. 6, the beam splitter 602 may be positioned inside the sensor housing 406 and coupled to the side of the sensor housing 406 below the lens 612 (or lens stack on the image side). This configuration allows the beam splitter 602 to be separated from the lens 612 (or lens stack), which can simplify the manufacturing process of the co-aligned LSCA. In some embodiments, the beam splitter 602 may be positioned above the lens 612 (or lens stack) on the object side or may be positioned within the lens stack.

Figure 7A:
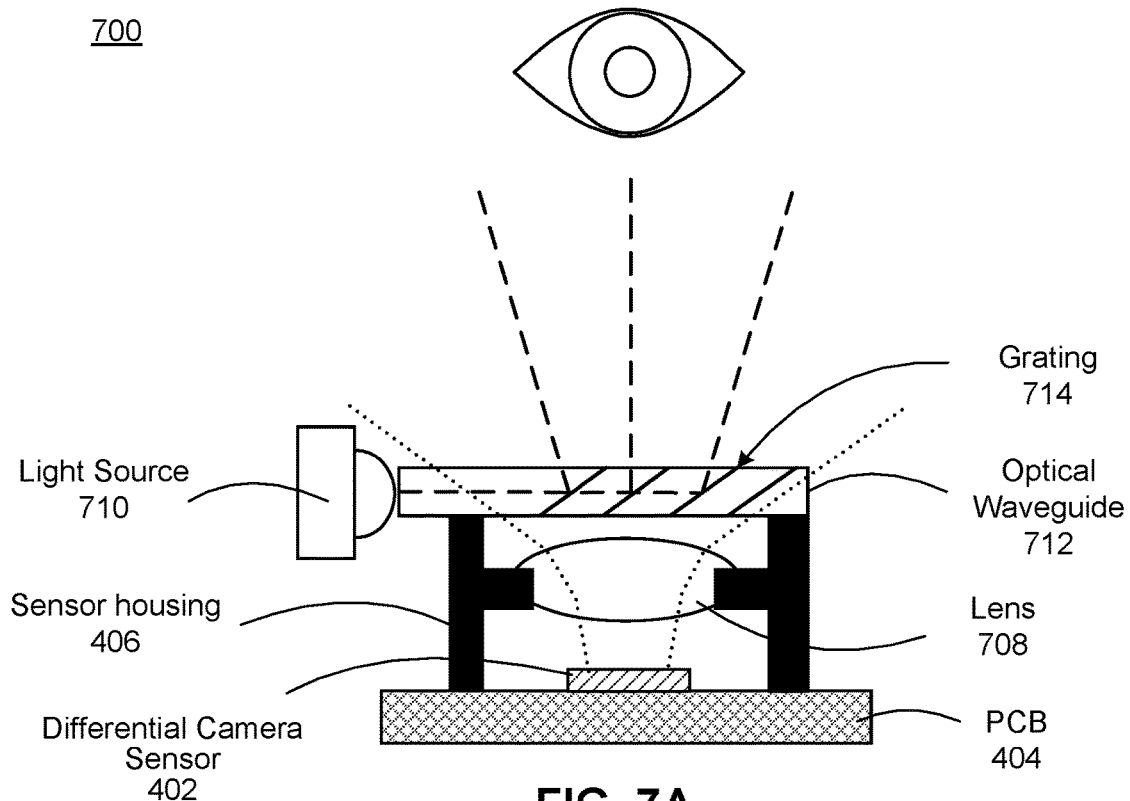
FIG. 7A depicts a cross-sectional view of an example co-aligned light source camera assembly that includes a waveguide and a grating, in accordance with one or more embodiments.

FIG. 7A depicts a cross-sectional view of an example co-aligned LSCA 700 with a optical waveguide 712 and a grating 714, in accordance with one or more embodiments. The co-aligned LSCA 700 includes the differential camera sensor 402, the PCB 404, the sensor housing 406, a lens 708, a light source 710, and an optical waveguide 712. The light source 710 and the lens 708 may be substantially the same as the light source 408 and the lens 410, respectively. In other embodiments, the co-aligned LSCA 700 includes different or additional elements. In addition, the functions may be distributed among the elements in a different manner than described.

The optical waveguide 712 is configured to receive and incouple light from the light source 710. The optical waveguide 712 directs the incoupled light toward a grating 714. The grating 714 is configured to outcouple the incoupled light in a first direction. In some embodiments, the grating 714 may be a diffractive grating or a reflection grating. In some embodiments, the grating 714 may be etched into the optical waveguide 712.

Some portion of the outcoupled light is reflected from the object (e.g., from the retina of the eye) back toward the co-aligned LSCA 700 along an optical path of the differential camera sensor 402. A portion of the reflected light passes through the optical waveguide 712 to the lens 708 which directs the light to the differential camera sensor 402.

Figure 7B:
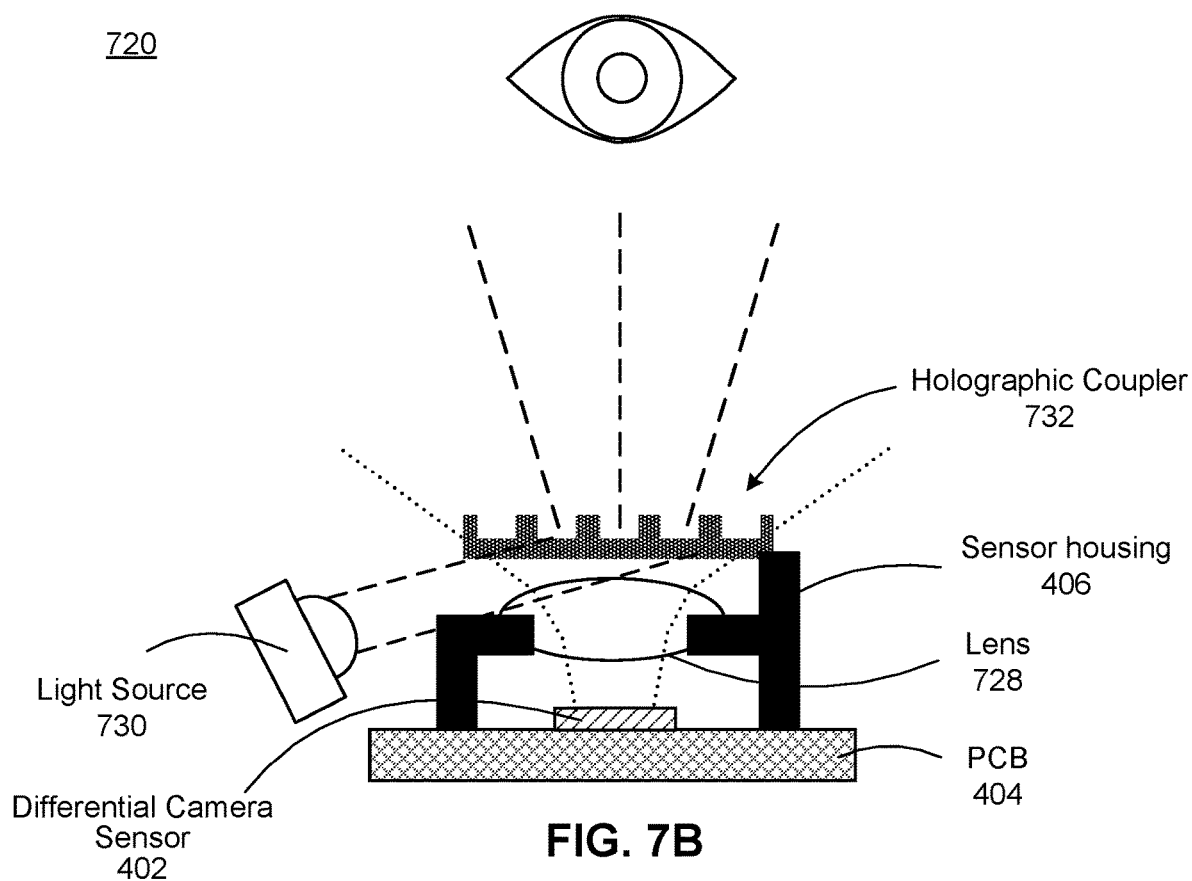
FIG. 7B depicts a cross-sectional view of an example co-aligned light source camera assembly that includes a holographic coupler, in accordance with one or more embodiments.

FIG. 7B depicts a cross-sectional view of an example co-aligned LSCA 720 with a holographic coupler 732, in accordance with one or more embodiments. The co-aligned LSCA 720 includes the differential camera sensor 402, the PCB 404, the sensor housing 406, a lens 728, a light source 730, and the holographic coupler 732. The light source 730 and the lens 728 may be substantially the same as the light source 408 and the lens 410, respectively. In other embodiments, the co-aligned LSCA 720 includes different or additional elements. In addition, the functions may be distributed among the elements in a different manner than described.

The light source 730 may be positioned such that an optical path of the light source 730 meets a surface of the holographic coupler 732 at an angle. The holographic coupler 732 redirects the light into the local area (e.g., towards an eye box). In some embodiments, the holographic coupler 732 may also implement non-geometric optic functions on the redirected light. Some portion of the redirected light is reflected from the object (e.g., from a retina of the eye) back toward the co-aligned LSCA 720 along an optical path of the differential camera sensor 402. A portion of the reflected light passes through the holographic coupler 732 to the lens 728 which directs the light to the differential camera sensor 402. In some embodiments, the controller may implement computational methods to correct for diffraction artifacts, such as blurring, color fringing, and light flares. The computation methods may include deconvolution algorithms, Fourier-based techniques, machine-learned algorithms, and simulations of the optical waveguide.

Figure 8:
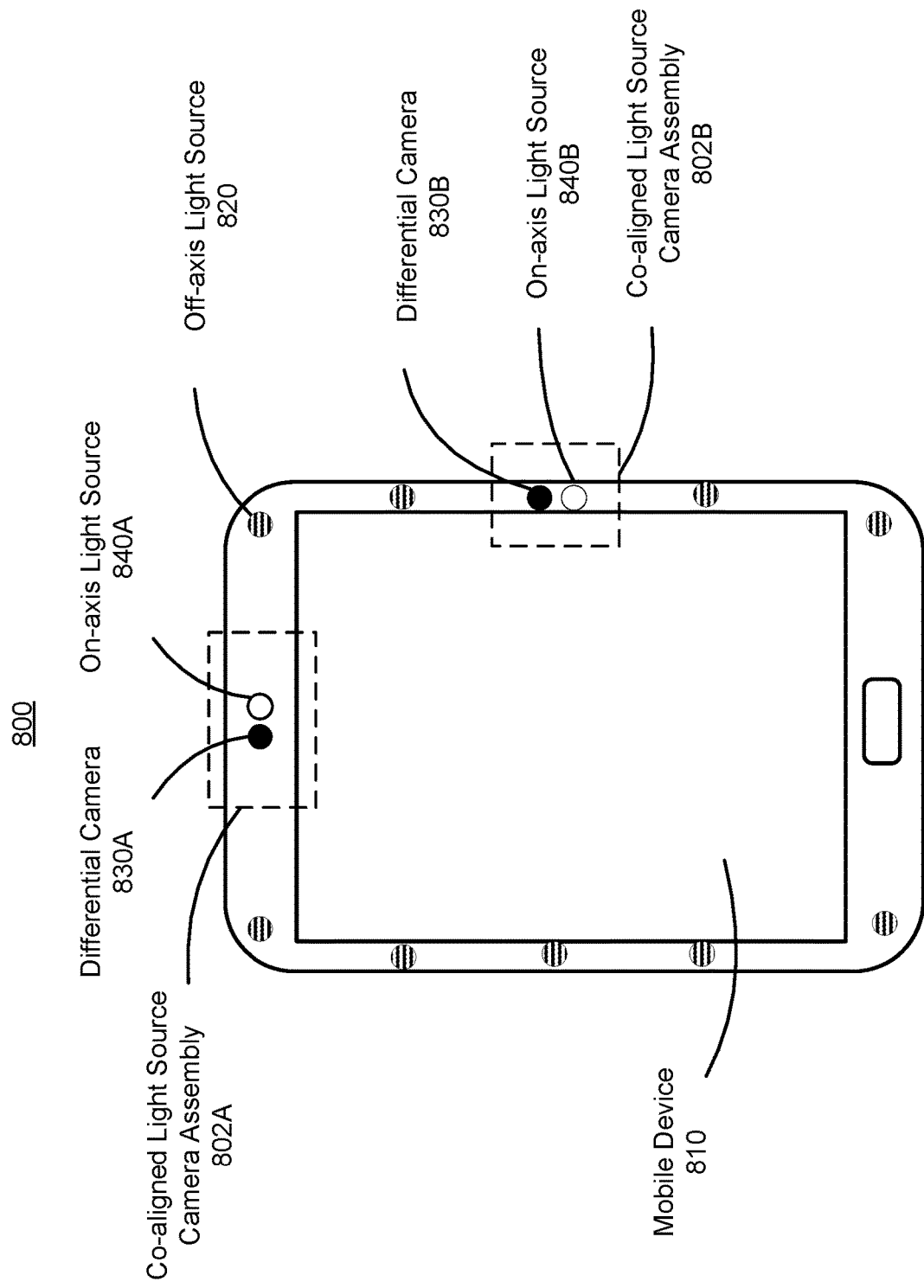
FIG. 8 is a perspective view of a mobile device including a differential camera system for object tracking, in accordance with one or more embodiments.

FIG. 8 is a perspective view of a mobile device 810 including a differential camera system 800 for object tracking, in accordance with one or more embodiments. Examples of the mobile device 810 include, and is not limited to, a mobile phone, tablet, and a computer. In some embodiments, the differential camera system may be included in a head-mounted device. Examples of the head-mounted device may include, and is not limited to, smart glasses, and augmented reality or virtual reality head-mounted displays. The differential camera system 800 is an embodiment of the differential camera system 100. As shown in this embodiment, the differential camera system 100 includes a plurality of co-aligned LSCAs (e.g., the co-aligned LSCA 802A, 802B), and a plurality of off-axis light sources (e.g., the off-axis light source 820), and a controller (not shown). The co-aligned LSCA 802A and the co-aligned LSCA 802B are collectively referred to as co-aligned LSCAs 802. Each of the co-aligned LSCAs 802 includes a differential camera, and an on-axis light source. For example, the co-aligned LSCA 802A includes a differential camera 830A and an on-axis light source 840A and the co-aligned LSCA 802B includes a differential camera 830B and an on-axis light source 840B. In other embodiments, the differential camera system may include more or less co-aligned LSCAs, and some other number of off-axis light sources.

The off-axis light sources are an embodiment of the off-axis light sources of FIG. 1. In the depicted embodiment of the differential camera system, the co-aligned LSCAs and off-axis light sources are located along a periphery of the mobile device. With the mobile device positioned in portrait mode (e.g., illustrated in FIG. 8), the co-aligned LSCAs are located at a center of a top border of the mobile device 810, and in the middle of the right border of the mobile device 810. This way, the differential camera system functions in portrait and landscape orientations.

In some embodiments, the controller may enable a single co-aligned LSCA based on an orientation of the mobile device 810. For example, the controller may determine that the mobile device 810 is in portrait mode (e.g., via an inertial measurement unit of the mobile device 810), and enable the co-aligned LSCA 802A on the short side of the periphery. And in cases where the controller determines that the mobile device 810 is in a landscape mode, enable the co-aligned LSCA 802B on the long side of the periphery. In some embodiments, the co-aligned light source of the co-aligned LSCA not being used may be used as an off-axis light source for the co-aligned LSCA that is enabled. In other embodiments, both sets of co-aligned LSCAs are enabled without regard to the orientation of the mobile device 810.

Figure 9A:
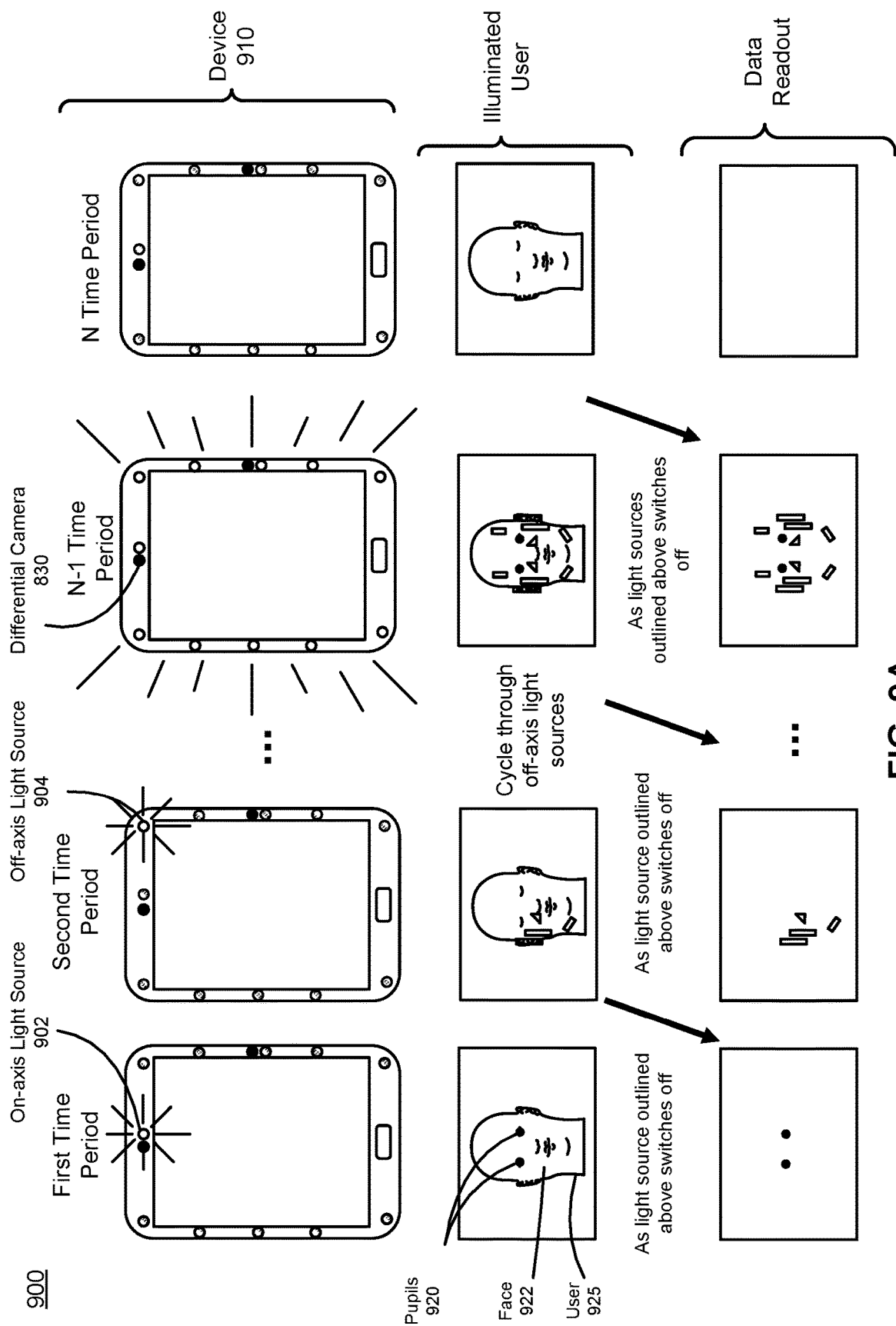
FIG. 9A is an example depicting object tracking using a differential camera system on a device, in accordance with one or more embodiments.

FIG. 9A is an example depicting object tracking using a differential camera system on a device, in accordance with one or more embodiments. As illustrated, the object is a face 922 and pupils 920 of a user 925. The differential camera system 900 is an embodiment of the differential camera system 100. As illustrated, for a given time period, light sources that are solid are active (i.e., emitting a pulse of IR light), and light sources that have a striped fill pattern are inactive. In the illustrated embodiment, the device 910 is used in portrait mode.

A controller (e.g., the controller 110) of the differential camera system selectively enables and disables one or more light sources of a plurality of light sources (i.e., the on-axis light source 902 and the off-axis light sources) to illuminate different portions of the face 922 and the pupils 920 of the user 925 over different time periods. In the illustrated embodiment, there are N time periods. In some embodiments, N may also refer to a number of off-axis light sources on the device 910. For each time period, a particular configuration of light sources is enabled (i.e., to emit one or more pulses of IR light) or disabled. In some embodiments, such as the illustrated embodiment, each time period is associated with a unique configuration of the plurality of light sources. For example, in the illustrated embodiment, the N time periods are each associated with a different lighting pattern. In other embodiments, one or more time periods may have a same configuration of the plurality of light sources. In some embodiments, a configuration may be that none of the plurality of light sources are enabled. In some embodiments, once the differential camera system has proceeded through N number of time periods (i.e., the various configurations), the differential camera system completes a tracking cycle for the object. Data from a single tracking cycle may be referred to as a frame (e.g., as described below with regard to FIG. 9B). In some embodiments, the differential camera system may then repeat the same tracking cycle, to product subsequent frames. And the frames may be used to track the object.

In the illustrated embodiment, a first time period is associated with a first configuration of the plurality of light sources where the on-axis light source 902 emits one or more pulses of IR light. As such, the controller instructs the on-axis light source 902 to emit a pulse of IR light directed along the optical path of the differential camera 830 (while the other light sources are disabled). Note that the on-axis light source 902 shares an optical path (e.g., the optical path 120) with the differential camera, accordingly, pupils 920 of the user 925 reflect the IR pulse back along the optical path toward the differential camera 830. The differential camera 830 detects changes in brightness in the field of view of the differential camera 830 caused by the pulse of IR light. The differential camera 830 asynchronously reads out data from pixels whose change in brightness meets threshold requirements. Note that for the first time period, the pixels whose brightness meet the threshold requirements generally correspond to the locations of pupils 920 of the user 925. Accordingly, the data read out from the differential camera 830 may be used for eye tracking. Note that the entire field of view of the differential camera is not read out—only pixels whose change in brightness meets the threshold requirements. In contrast, a conventional camera would read out an image frame using data from all of the pixels.

A second time period is associated with a second lighting configuration of the plurality of light sources, where an off-axis light source 904 emits one or more pulses of IR light. The controller instructs the off-axis light source 904 to emit a pulse of IR light. The light pulse creates areas of increased light intensity and areas of shadow with low light intensity on the face 922 (e.g., helps increase contrast in light reflected from the retinas and the light reflected off the skin of the user). The changes in brightness in the field view of the differential camera (e.g., 830A and/or 830B) are detected by the differential camera. The differential camera asynchronously reads out data from pixels whose change in brightness meets threshold requirements. In this manner, the device 910 illuminates portions of the user 925 (e.g., face 922 and/or pupils 920) over different time periods using various lighting configurations. For example, in some embodiments, for time periods between the second time period and the N−1 time period, the controller may activate at least one different light source than what had been active in a previous time period (and in some embodiments, may also keep active one or more light sources that were previously activated).

A N−1 time period is associated with a lighting configuration of the tracking cycle, where all of the light sources (both on-axis and off-axis) are instructed to emit one or more pulses of IR light towards the face 922 to illuminate the face. The differential camera is configured to detect a change in brightness of the object caused in part by one or more of the pulses of IR light, and asynchronously output data samples corresponding to the detected changes in brightness. The controller processes the data samples to track the object.

A N time period is associated with a final lighting configuration of the tracking cycle. In this example, the final lighting configuration has all of the light sources inactive. The differential camera system 900 completes a tracking cycle for the face 922 once it has proceeded through each of N time periods. Data from a single tracking cycle may be referred to as a frame (e.g., further described in FIG. 9B). The controller uses the frame and subsequent frames to track the face 922 and the pupils 920. Note that while the illustrated sequence has specific time periods associated with specific lighting configurations—in other embodiments, different lighting configurations may be associated with different lighting configurations. For example, a first time period may have all light sources active. Likewise in some embodiments, there may not be a time period where, e.g., all of the light sources are in active.

Figure 9B:
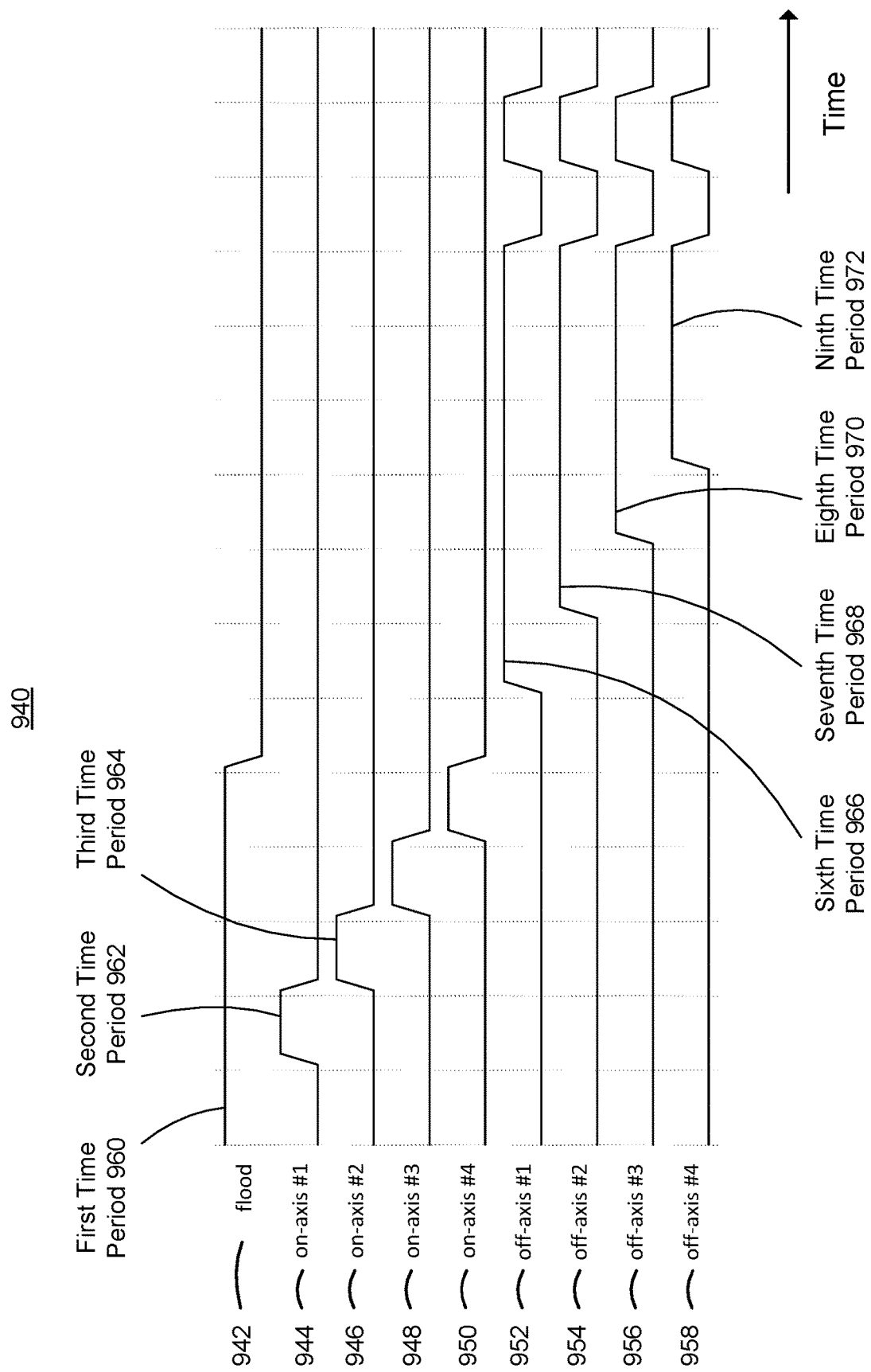
FIG. 9B is an example timing diagram for the differential camera system of FIG. 9A, in accordance with one or more embodiments.

FIG. 9B is an example timing diagram 940 for a single frame, according to one or more embodiments. The single frame includes a plurality of time periods (and some are overlapping). In the illustrated timing diagram, for simplicity, there are four on-axis light sources, and four off-axis light sources. In other embodiments, there may be more or less of the on-axis light sources, more or less of the off-axis light sources, or both. As illustrated, the timing diagram shows when on-axis light source 944, on-axis light source 946, on-axis light source 948, on-axis light source 950, off-axis light source 952, off-axis light source 954, off-axis light source 956, off-axis light source 958, and all off-axis lights sources (i.e., flood illumination 942) are active or inactive. Note that the timing diagram illustrates specific lighting configurations at different times. In other embodiments, different combinations of light sources may be active and/or inactive at different times.

In the example timing diagram, a first time period begins with flood illumination 942 (i.e., all off-axis light sources are on), while the on-axis light sources are off. In some embodiments, such as in the example embodiment, the flood illumination 942 may be used during eye tracking to increase the contrast between the light reflected off of the retina and light reflected off of the skin.

In this example, different on-axis light sources are active over different time periods that overlap with the first time period 960 (i.e., while the flood illumination is active). The on-axis light source 944 is active over a second time period 962, while the remaining on-axis light sources are inactive. Similarly, the on-axis light source 946 is active over a third time period 964 that is subsequent to the second time period 962, but also within the first time period 960, and so on, for the remaining on-axis light sources. In this manner, the controller cycles through the different on-axis light sources while all of the off-axis light sources are emitting flood illumination 942.

As shown, after the first time period 960 is complete (flood illumination 942 ceases), the off-axis light source 952 becomes active over a sixth time period 966. And during a portion of the sixth time period 966, the off-axis light source 954 is active over a seventh time period 968 that occurs current with a portion of the sixth time period 966 and is shorter than the sixth time period. Similarly, during a portion of the seventh time period 968, the off-axis light source 956 is active over an eighth time period 970 that occurs current with a portion of the seventh time period 968 and is shorter than the seventh time period 968. And during a portion of the eighth time period 970, the off-axis light source 958 is active over a ninth time period 972 that occurs current with a portion of the eighth time period 970 and is shorter than the eighth time period 970. Note as shown the sixth time period 966, the seventh time period 968, the eighth time period 970, and the ninth time period 972 all end at a same time, are followed by an inactive period, and then all are active over a same time period.

During some or all of the time periods, the differential camera is configured to detect changes in brightness of the retinas and/or the face caused in part by varying light configurations, and asynchronously output data samples corresponding to the detected changes in brightness. The controller processes the data for eye and/or face tracking.

Figure 9C:
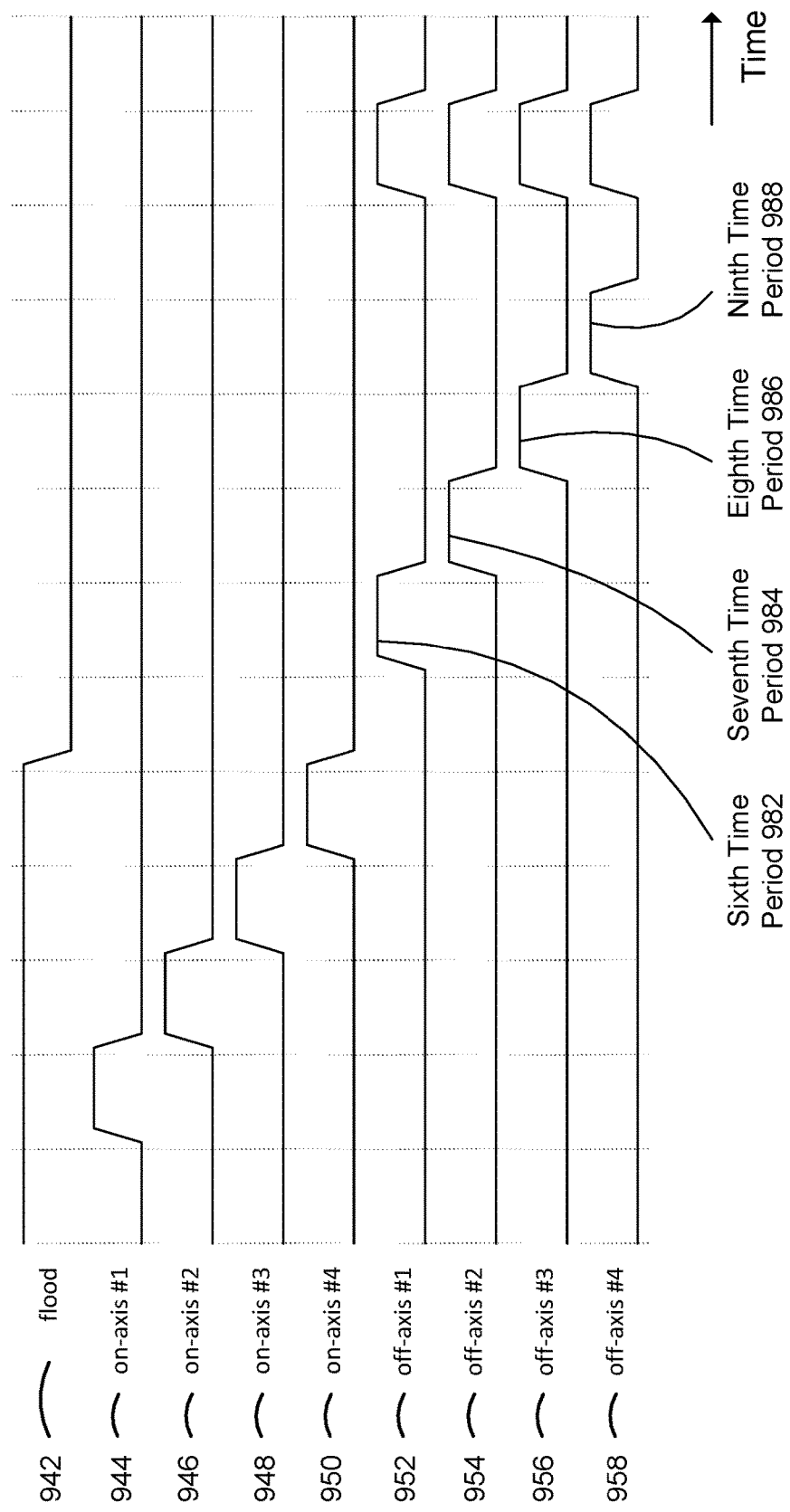
FIG. 9C is an example timing diagram for the differential camera system of FIG. 9A, in accordance with one or more embodiments.

FIG. 9C is another example timing diagram 980 for a single frame, according to one or more embodiments. FIG. 9C is substantially similar to FIG. 9B, except when the off-axis light sources are active during the fifth time period of active. In contrast to the previously described example in FIG. 9B, after flood illumination ends, the off-axis light source 952 is active for a sixth time period 982, and once the sixth time period 982 ends, the off-axis light source 954 is active for a seventh time period 984. And once the seventh time period 984 ends, the off-axis light source 956 is active for an eighth time period 986. And once the eighth time period 986 ends, the off-axis light source 958 is active for a ninth time period 988. The ninth time period 988 is followed by an inactive period, and then all of the off-axis light sources are active over a same time period.

Figure 10:
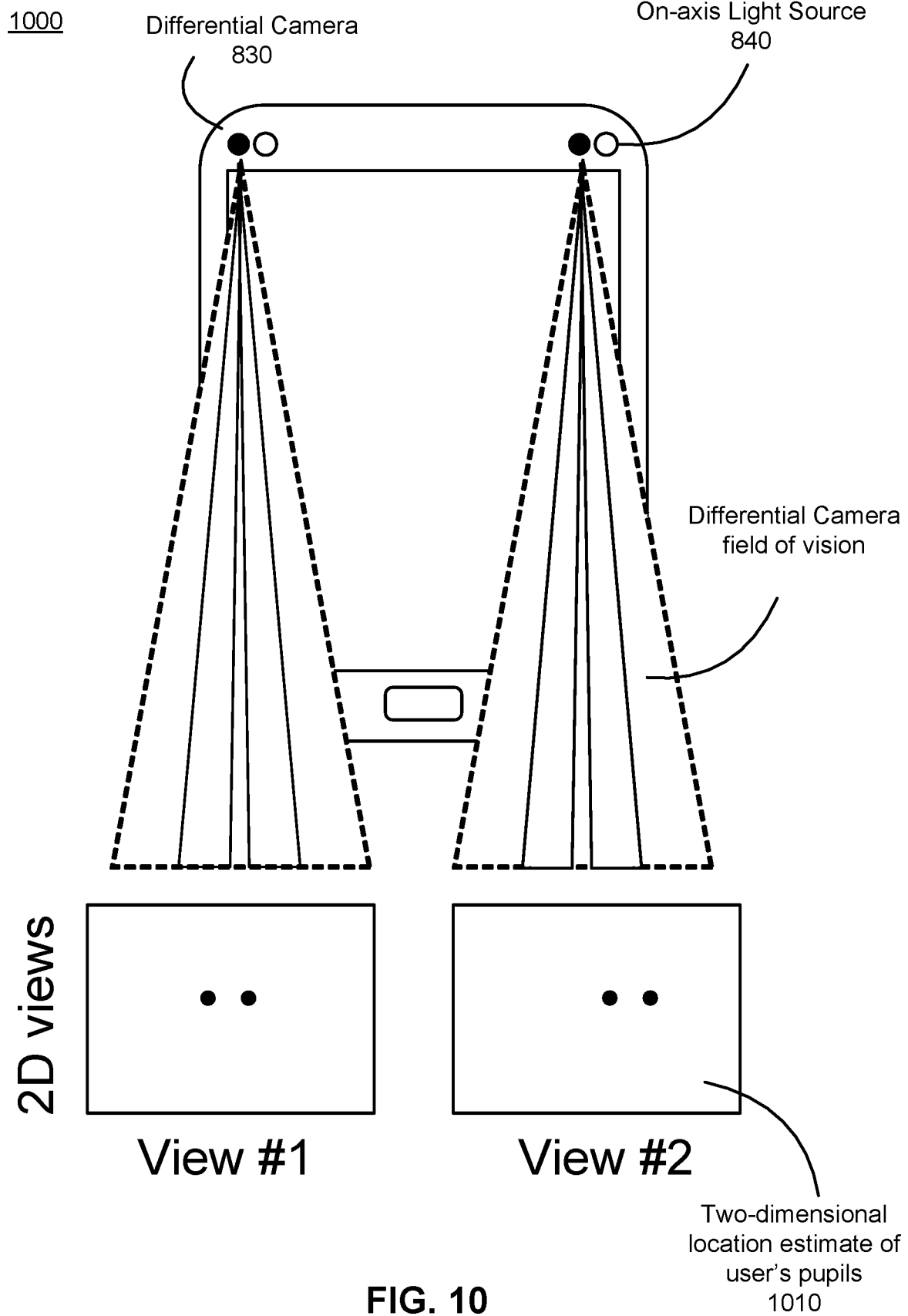
FIG. 10 is an example differential camera system configured to provide depth information, in accordance with one or more embodiments.

FIG. 10 is a differential camera system 1000 for three-dimensional pupil estimation that includes additional differential cameras and on-axis light sources. By adding additional differential cameras 830 with co-axial illumination, independent location estimates 1010 of each pupil in two-dimensional space can be derived from the data output of the differential cameras. Estimated spatial coordinates of the user's pupil in three-dimensional space can then be determined using the two-dimensional independent location estimates 1010. A gaze vector may be calculated using the three-dimensional spatial location of the user's pupil. In some embodiments, structured light sources may be used as on-axis light sources to project a dot pattern, line grid, or other pattern on the user's face to create a face model of the user's face. Each facial feature can then be identified, and its spatial location can be calculated using geometric measurements between the structured light source and the differential camera.

FIG. 11A is a perspective view 1100 of a device 1110 including a differential camera system for object tracking, in accordance with one or more embodiments. Examples of the device 1110 could be, and is not limited to, a headset, a console, a computer, etc. The differential camera system is an embodiment of the differential camera system 100 which does not include the on-axis light source. The off-axis light sources (e.g., the off-axis light sources 1130, 1140) are an embodiment of the off-axis light sources of FIGS. 1 and 8. As shown the off-axis light sources are located in alignment with the differential camera 830. In other embodiments, the off-axis light sources may be located in different positions on the device 1110. In some embodiments there may be more off-axis light sources than shown in FIG. 11A.

FIG. 11B is an example depicting object tracking using the differential camera system of FIG. 11A. As illustrated, the object 1170 in this example is a teapot. The differential camera system 1120 is an embodiment of the differential camera system 100.

A controller (e.g., the controller 110) of the differential camera system selectively enables and disables one or more light sources of the plurality of light sources to illuminate different portions of an object 1170 over different time periods. As shown, there are N, time periods, where N is an integer. For each time period a particular configuration of light sources is enabled (i.e., to emit one or more pulses of IR light) or disabled. In some embodiments, each time period is associated with a unique configuration of the plurality of light sources. In other embodiments, one or more time periods may have a same configuration of the plurality of light sources. In some embodiments, a configuration may be that none of the plurality of light sources are enabled. In some embodiments, once the differential camera system has proceeded through each of N time periods (i.e., the various configurations), the differential camera system completes a tracking cycle for the object. In some embodiments, the differential camera system may then repeat the same tracking cycle, to product subsequent frames. And the frames may be used to track the object.

In the illustrated embodiment, a first time period is associated with a first configuration of the plurality of light sources where the off-axis light source 1130 emits one or more pulses of IR light. The light pulse creates areas of increased light intensity and areas of shadow with low light intensity on the object 1170. The differential camera 830 detects changes in brightness in the field of view of the differential camera 830 caused by the pulse of IR light. The differential camera 830 asynchronously reads out data from pixels whose change in brightness meets threshold requirements. Note that the entire field of view of the differential camera is not read out—only pixels whose change in brightness meets the threshold requirements.

A second time period is associated with a second lighting configuration of the plurality of light sources, where a different off-axis light source 1140 emits one or more pulses of IR light. The controller instructs the off-axis light source 1140 to emit a pulse of IR light. The light pulse creates areas of increased light intensity and areas of shadow with low light intensity on the object 1170. The changes in brightness in the field view of the differential camera 830 are detected by the differential camera 830. The differential camera 830 asynchronously reads out data from pixels whose change in brightness meets threshold requirements.

A third time period is associated with a lighting configuration where all of the light sources are instructed to emit one or more pulses of IR light towards the object to illuminate the object. Similar to the previous time periods, the differential camera detects the changes in brightness in its field of view, and asynchronously outputs data samples for pixels based on some threshold amount of change in brightness.

In the illustrated example, a fourth time period is associated with a final lighting configuration of the tracking cycle, where all of the light sources are inactive. In this example, this lighting configuration marks the end of a tracking cycle. The device 1110 completes a tracking cycle for the object once it has proceeded through each of N (i.e., 4 in the illustrated example) time periods. Data from a single tracking cycle may be referred to as a frame, which the controller uses to track the object 1170.

Figure 12:
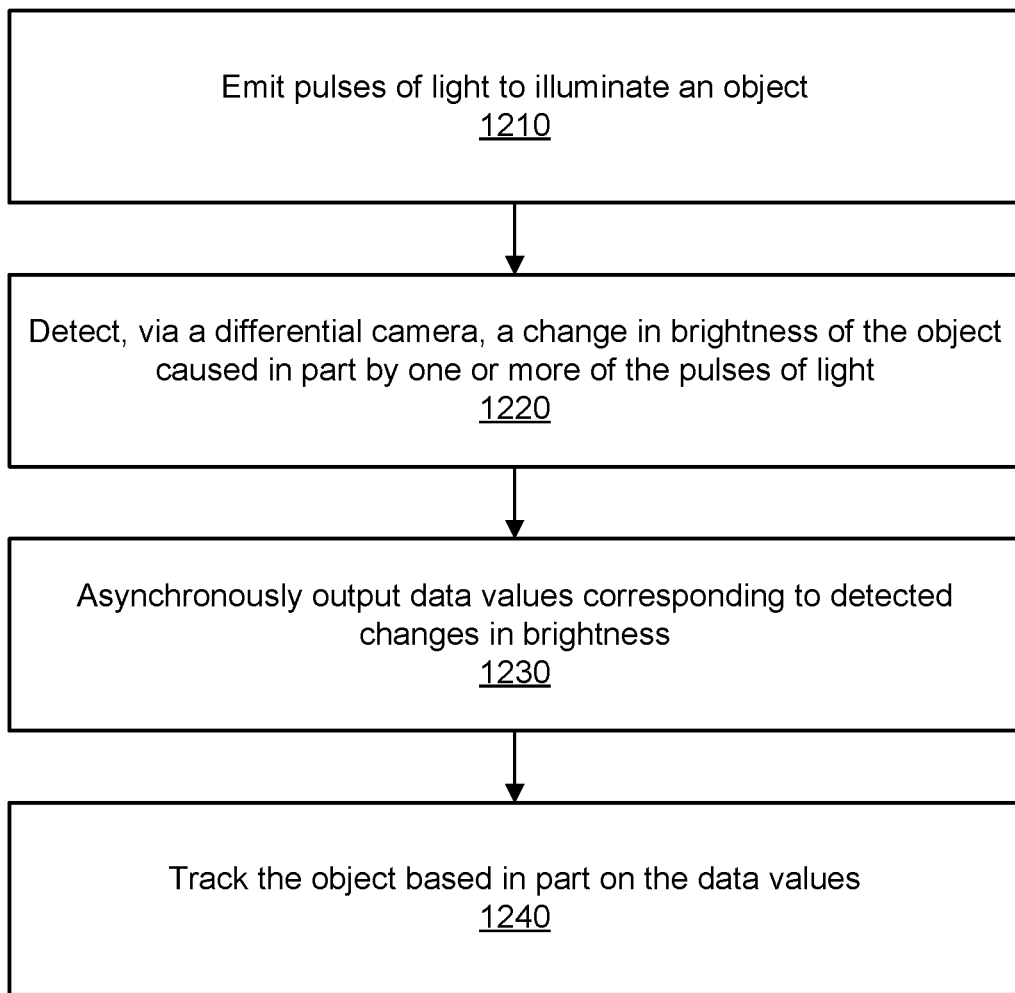
FIG. 12 is a flowchart illustrating a process for object tracking using a differential camera system, in accordance with one or more embodiments.

FIG. 12 is a flowchart illustrating a process for object tracking using a differential camera system, in accordance with one or more embodiments. The process shown in FIG. 12 may be performed by components of a differential camera system (e.g., the differential camera system 100). Other entities may perform some or all of the steps in FIG. 12 in other embodiments. Embodiments may include different and/or additional steps, or perform the steps in different orders.

The differential camera system emits 1210 pulses of light to illuminate an object. A controller of the differential camera determines a particular configuration of light sources. The controller then instructs at least one on-axis light source, at least one off-axis light source, or some combination thereof, to emit one or more pulses of light in accordance with the configuration.

The differential camera system detects 1220 a change in brightness of the object caused in part by one or more of the pulses of light. The differential camera system includes at least one differential camera that is configured to detect a change in brightness in its field of vision. Responsive to the controller instructing the light sources to cycle through various lighting configurations, the differential camera detects the change in light intensity of each lighting configuration.

The differential camera system asynchronously outputs 1230 data samples corresponding to detected changes in brightness. The differential camera asynchronously outputs data samples for pixels based on a pre-defined threshold amount for change in brightness. In contrast, a conventional camera reads out all pixel values to generate an image frame, and objects are tracked by processing each of the image frames which can result in high bandwidth and power requirements for object tracking.

The differential camera system tracks 1240 an object based in part on the data samples. The controller 110 processes the data samples from the differential camera to identify the object, which include, and is not limited to, pupils, a face, hands, and physical objects. The controller may also use the data samples to determine eye or face orientation and/or gaze location of the eye based on identified pupils and/or a face.

The differential camera system 1200 may dynamically adjust illumination and/or camera settings to optimize image quality and detection performance. The controller may, e.g., increase or decrease brightness of light emitted by light sources (i.e., the co-aligned IR source and/or the one or more off-axis light sources), adjust periods of time over which the light sources are active, adjust periods of time over which the differential camera is active, adjust which of the one or more off-axis sources are active, adjust a threshold for pixels of the differential camera to report a change, or some combination thereof. As such, the controller may use the above to mitigate and in some cases eliminate background noise from the image to optimize object detection.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A co-aligned light source camera assembly (LSCA) comprising:
  a light source configured to emit light that is directed along an optical path towards an eye box including an eye of a user;
  a differential camera sensor configured to detect a change in brightness of the eye caused in part by the emitted light, and asynchronously output data samples corresponding to the detected change in brightness, wherein the optical path is substantially co-aligned with an optical path of the differential camera sensor;
  an aperture in a sensor housing that is positioned between the differential camera sensor and the eye box; and
  a second light source configured to emit one or more pulses of light along a second optical path towards the eye box, the second light source positioned adjacent to the aperture such that the one or more pulses of light are substantially co-aligned with the optical path of the differential camera sensor, and
  wherein a controller is configured to:
    identify a pupil of the eye based on data samples output from the differential camera sensor resulting from the emitted light, and
    determine a gaze location of the user based in part on the identified pupil.

2. The co-aligned LSCA of claim 1, further comprising:
  an off-axis light source that is off-axis relative to the optical path, the off-axis light source configured to emit light towards the eye box of the user, the eye reflecting the light along the optical path towards the differential camera sensor.

3. The co-aligned LSCA of claim 1, further comprising a lens that is positioned within the aperture, wherein the light source is positioned adjacent to the lens, and the light source has an optical path that is substantially co-aligned with the optical path of the differential camera sensor.

4. The co-aligned LSCA of claim 1, further comprising:
  an optical waveguide that optically couples light from the light source to an emission location, wherein the emission location is positioned adjacent to the aperture, and the emission location emits light that that is substantially co-aligned with the optical path of the differential camera sensor.

5. The co-aligned LSCA of claim 3, wherein the aperture is a pinhole.

6. The co-aligned LSCA of claim 1, wherein the aperture is a pinhole.

7. A co-aligned light source camera assembly (LSCA) comprising:
  a light source configured to emit light that is directed along an optical path towards an eye box including an eye of a user;
  a differential camera sensor configured to detect a change in brightness of the eye caused in part by the emitted light, and asynchronously output data samples corresponding to the detected change in brightness, wherein the optical path is substantially co-aligned with an optical path of the differential camera sensor;
  an aperture in a sensor housing that is positioned between the differential camera sensor and the eye box;
  a second light source configured to emit one or more pulses of light along a second optical path towards the eye box, the second light source positioned adjacent to the aperture such that the one or more pulses of light are substantially co-aligned with the optical path of the differential camera sensor; and
  a pinhole reflector comprising a reflective surface that reflects light from the light source towards the eye box, and a pinhole through which light from the eye box passes through to reach the differential camera sensor, wherein the pinhole reflector is positioned at a 45-degree angle with respect to the optical path of the differential camera sensor, and
  wherein a controller is configured to:
    identify a pupil of the eye based on data samples output from the differential camera sensor resulting from the emitted light, and
    determine a gaze location of the user based in part on the identified pupil.

8. The co-aligned LSCA of claim 1, further comprising:
  a beam splitter configured to:
    redirect at least a portion of the emitted light such that it propagates substantially along the optical path towards the eye box, and
    transmit light reflected from the eye back along the optical path toward the differential camera sensor.

9. The co-aligned LSCA of claim 1, further comprising:
  a waveguide configured to incouple the light from the light source; and
  a grating coupled to the waveguide that is configured to outcouple the incoupled light towards the eye box.

10. The co-aligned LSCA of claim 1, further comprising:
  a holographic coupler configured to redirect light from the light source towards the eye box.

11. A tracking system comprising:
  a co-aligned light source camera assembly (LSCA) comprising:
    a light source configured to emit light, the emitted light that is directed along an optical path towards an eye box including an eye of a user, and
    a differential camera sensor configured to detect a change in brightness of the eye caused in part by the emitted light, and asynchronously output data samples corresponding to the detected change in brightness, wherein the optical path is substantially co-aligned with an optical path of the differential camera sensor; and
  a controller that is configured to:
    identify a pupil of the eye based on data samples output from the differential camera sensor resulting from the emitted light,
    determine a gaze location of the user based in part on the identified pupil, instruct the differential camera sensor to obtain one or more data samples, the data samples describing a movement of an eye of a user, calculate metrics of the movement of the eye based on the data samples, apply a model to the calculated metrics of the movement of the eye to predict a time to obtain a next data sample, and instruct the differential camera sensor to obtain the next data sample at the predicted time.

12. The tracking system of claim 11, further comprising: an aperture in a sensor housing that is positioned between the differential camera sensor and the eye box.

13. The tracking system of claim 11, further comprising: an off-axis light source that is off-axis relative to the optical path, the off-axis light source configured to emit light towards the eye box of the user, the eye reflecting the light along the optical path towards the differential camera sensor.

14. The tracking system of claim 12, wherein the co-aligned LSCA further comprises a lens that is positioned within the aperture, wherein the light source is positioned adjacent to the lens, and the light source has an optical path that is substantially co-aligned with the optical path of the differential camera sensor.

15. The tracking system of claim 11, wherein the metrics of the movement of the eye comprise at least one of: a velocity of the eye, an acceleration of the eye, and a pupil jitter.

16. The tracking system of claim 13, wherein the controller is further configured to:

compute attributes of a plurality of data samples obtained by the tracking system over a time interval; and determine a state of the tracking system based on the computed attributes.

17. The tracking system of claim 11, wherein the co-aligned LSCA further comprises:

a pinhole reflector comprising a reflective surface that reflects light from the light source towards the eye box, and a pinhole through which light from the eye box passes through to reach the differential camera sensor.

18. The tracking system of claim 15, wherein the co-aligned LSCA further comprises:

a beam splitter configured to:

redirect at least a portion of the emitted light such that it propagates substantially along the optical path towards the eye box, and transmit light reflected from the eye back along the optical path toward the differential camera sensor.

* * * * *